US012711633B2

(12) United States Patent
Chiba et al.

(10) Patent No.: US 12,711,633 B2
(45) Date of Patent: Aug. 18, 2026

(54) IMAGE PROCESSING DEVICE, IMAGE PROCESSING METHOD, PROJECTOR DEVICE

(71) Applicant: SONY GROUP CORPORATION, Tokyo (JP)

(72) Inventors: Atsuhiro Chiba, Tokyo (JP); Shogo Kubota, Kanagawa (JP); Mariko Nishiyama, Kanagawa (JP); Ryo Miyao, Kanagawa (JP); Tetsuo Ikeda, Tokyo (JP); Maho Hayashi, Tokyo (JP); Yuya Takayama, Tokyo (JP)

(73) Assignee: Sony Group Corporation, Tokyo (JP)

( * ) Notice: Subject to any disclaimer, the term of this patent is extended or adjusted under 35 U.S.C. 154(b) by 439 days.

(21) Appl. No.: 18/546,249

(22) PCT Filed: Jan. 27, 2022

(86) PCT No.: PCT/JP2022/003042
§ 371 (c)(1),
(2) Date: Aug. 11, 2023

(87) PCT Pub. No.: WO2022/181174
PCT Pub. Date: Sep. 1, 2022

(65) Prior Publication Data

US 2024/0112446 A1 Apr. 4, 2024

(30) Foreign Application Priority Data

Feb. 24, 2021 (JP) ................................ 2021-027742

(51) Int. Cl.
*G06T 7/194* (2017.01)
*G06T 3/40* (2006.01)
(Continued)

(52) U.S. Cl.
CPC ................ *G06T 7/194* (2017.01); *G06T 3/40* (2013.01); *G06V 10/751* (2022.01); *G06V 10/764* (2022.01); *G06V 2201/07* (2022.01)

(58) Field of Classification Search
CPC .. G06T 7/194; G06T 3/40; G06T 5/94; G06T 7/11; G06T 7/33; G06T 5/00;
(Continued)

(56) References Cited

U.S. PATENT DOCUMENTS 6,288,703 B1 * 9/2001 Berman .................. H04N 9/75 382/163
8,300,890 B1 * 10/2012 Gaikwad ............... H04N 5/144 382/173
(Continued)

FOREIGN PATENT DOCUMENTS

JP 2002-279401 9/2002
JP 2017-097800 6/2017
(Continued)

OTHER PUBLICATIONS

Geoffrey A. Fowler: “Flawless or fake? Google’s AI now fixes smiles”, The Washington Post, Oct. 11, 2023 (Oct. 11, 2023), XP093155608.

(Continued)

*Primary Examiner* — Aaron W Carter
(74) *Attorney, Agent, or Firm* — SHERIDAN ROSS P.C.

(57) ABSTRACT

An image processing device according to the present technology includes: a foreground-background classification unit configured to classify an input image into a foreground image portion which is a portion in which a subject in a foreground is captured and a background image portion which is a portion in which a subject in a background farther than the foreground image portion is captured; a foreground correction unit configured to correct the foreground image
(Continued)

portion; and an inconsistency correction unit configured to correct an inconsistent portion caused by the correction of the foreground image portion by the foreground correction unit.

15 Claims, 20 Drawing Sheets

(51) Int. Cl.
*G06V 10/75* (2022.01)
*G06V 10/764* (2022.01)

(58) Field of Classification Search
CPC ............... G06V 10/751; G06V 10/764; G06V 2201/07; G06V 10/28; H04N 9/3179; H04N 9/3188; H04N 9/3194; H04N 5/66
See application file for complete search history.

(56) References Cited

U.S. PATENT DOCUMENTS 8,391,594 B1 * 3/2013 Wang ...................... G06T 7/143 382/199
2003/0219146 A1 * 11/2003 Jepson .................... G06T 7/251 382/103
2004/0062450 A1 * 4/2004 Kondo .................... G06T 7/215 348/E5.058
2004/0109004 A1 * 6/2004 Bastos .................... G06T 15/04 345/587
2007/0273765 A1 * 11/2007 Wang ...................... G06T 7/254 348/152
2008/0181507 A1 * 7/2008 Gope ...................... G06T 7/194 382/284
2008/0316328 A1 * 12/2008 Steinberg ............. H04N 23/611 348/222.1
2009/0033682 A1 * 2/2009 Kaida ...................... H04N 9/67 345/634
2009/0284627 A1 * 11/2009 Bando ....................... G06T 7/50 382/173
2010/0266207 A1 * 10/2010 Zhang .................... H04N 5/262 382/255
2011/0038536 A1 * 2/2011 Gong ........................ G06T 7/11 382/164
2013/0135298 A1 * 5/2013 Isogai ................... G06T 15/205 345/419
2014/0002596 A1 * 1/2014 Antonio ................. H04N 19/86 348/43
2015/0221066 A1 * 8/2015 Kobayashi .............. G06T 11/00 382/284
2018/0247447 A1 * 8/2018 Serna ...................... G06T 15/40
2019/0035125 A1 * 1/2019 Bellows ................. G06V 20/10
2019/0147598 A1 5/2019 Sawai
2020/0143582 A1 5/2020 Matsushita et al.
2020/0258196 A1 * 8/2020 Kokura ..................... G06T 5/50
2020/0389573 A1 * 12/2020 Kobayashi ............. H04N 23/72
2021/0004943 A1 1/2021 Fukasawa et al.
2021/0358088 A1 * 11/2021 Lundberg ......... G08B 13/19604
2022/0292691 A1 * 9/2022 Kitamura .................. G06T 5/20
2024/0112446 A1 * 4/2024 Chiba ..................... G06T 7/194
2024/0404180 A1 * 12/2024 Kobayashi ............ G06T 15/205
2025/0095283 A1 * 3/2025 Pinhasov .............. G06T 15/506

FOREIGN PATENT DOCUMENTS

| | | |
|---|---|---|
| JP | 2019-092076 | 6/2019 |
| JP | 2020-027409 | 2/2020 |
| JP | 2020-077165 | 5/2020 |
| WO | WO 2019/186787 | 10/2019 |

OTHER PUBLICATIONS

International Search Report and Written Opinion prepared by the Japan Patent Office on Apr. 4, 2022, for International Application No. PCT/JP2022/003042, 3 pgs.

* cited by examiner

Figure 11:
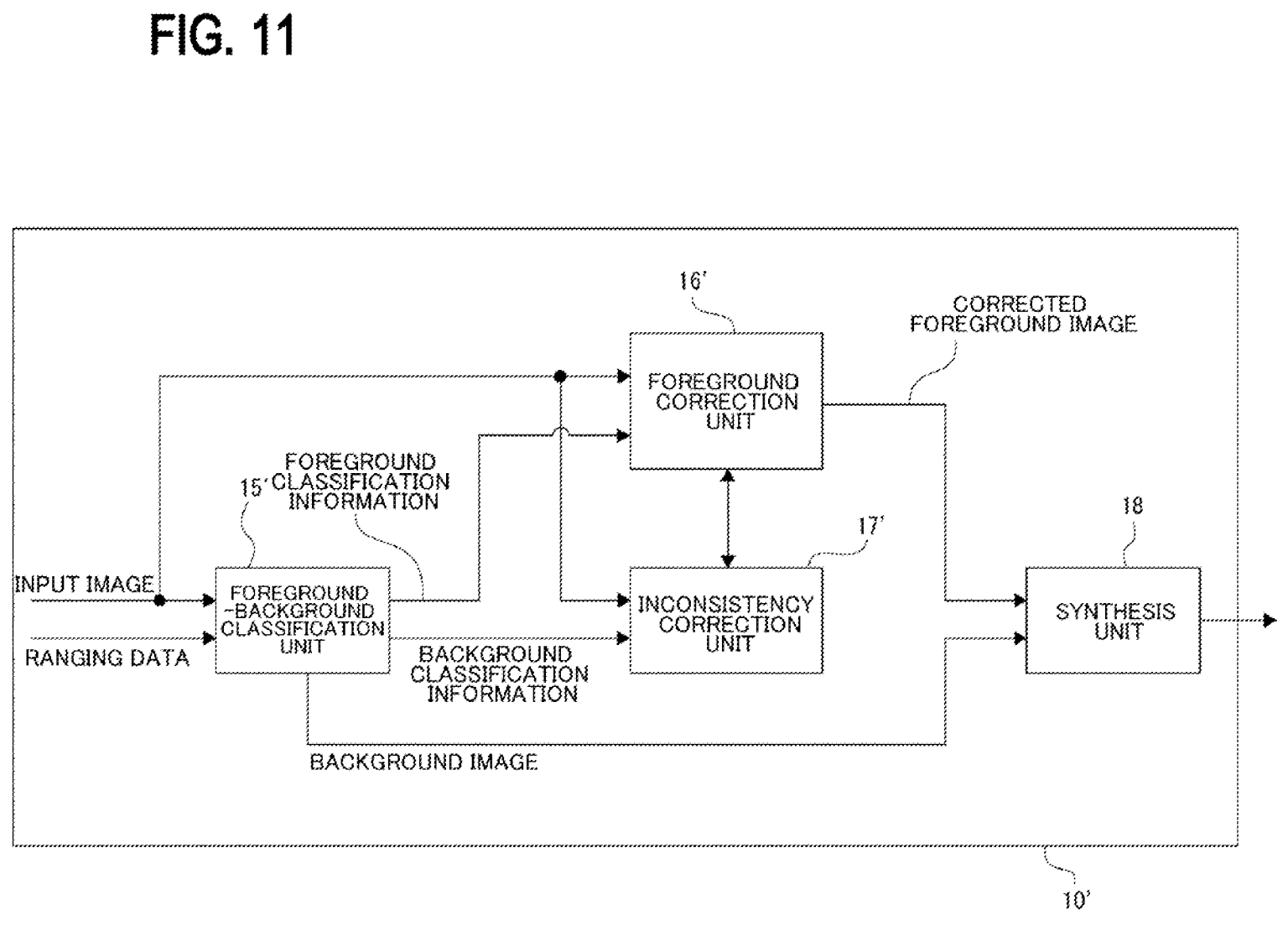

INPUT IMAGE
RANGING DATA
15'
FOREGROUND -BACKGROUND CLASSIFICATION UNIT
FOREGROUND CLASSIFICATION INFORMATION
BACKGROUND CLASSIFICATION INFORMATION
BACKGROUND IMAGE
16'
FOREGROUND CORRECTION UNIT
17'
INCONSISTENCY CORRECTION UNIT
CORRECTED FOREGROUND IMAGE
18
SYNTHESIS UNIT
10'

FOREGROUND CLASSIFICATION INFORMATION

BACKGROUND CLASSIFICATION INFORMATION

FIG. 14B

USER DISTANCE

FIG. 14 A

USER DISTANCE

IMAGE PROCESSING DEVICE, IMAGE PROCESSING METHOD, PROJECTOR DEVICE

CROSS REFERENCE TO RELATED APPLICATIONS

This application is a national stage application under 35 U.S.C. 371 and claims the benefit of PCT Application No. PCT/JP2022/003042, having an international filing date of 27 Jan. 2022, which designated the United States, which PCT application claimed the benefit of Japanese Patent Application No. 2021-027742, filed 24 Feb. 2021, the entire disclosures of each of which are incorporated herein by reference.

TECHNICAL FIELD

The present technology relates to an image processing device, a method thereof, and a projector device including elements of the image processing device. In particular, the present technology relates to an image processing technology suitable for classifying an input image into a foreground image portion and a background image portion and correcting the foreground image portion.

BACKGROUND ART

For example, there is an increasing demand for public viewing and group viewing that allow events such as sports games and concerts to be enjoyed at remote venues. In these viewing styles such as public viewing and group viewing, captured images of the venue where the event is actually being held are displayed on a display device placed at a remote venue. At this time, in order to enhance the sense of unity with the event, it is required that the display at the remote venue be performed on a large screen.

An example of the related art can include PTL 1 below. PTL 1 discloses a technique related to an image processing device including a correction unit that adaptively corrects the image quality of at least one of the foreground and background images according to the image quality difference between the foreground and the background images and a synthesis unit that generates a composite image by synthesizing the corrected foreground and background images.

CITATION LIST

Patent Literature

[PTL 1]
JP 2020-27409A

SUMMARY

Technical Problem

Here, in a remote venue, when an image captured from the audience seats is displayed on a large screen as a captured image of the event, for example, the spectator close to the camera will be captured in a close-up shot on the screen. For example, depending on the screen size, the spectator closer to the camera may be displayed larger than life-size, which may give the user a strong sense of strangeness and greatly impair the sense of immersion.

The present technology has been made in view of the above circumstances, and an object thereof is to alleviate the user's sense of strangeness associated with the display of a subject in the foreground, and to improve the user's sense of immersion in image content.

Solution to Problem

An image processing device according to the present technology includes: a foreground-background classification unit configured to classify an input image into a foreground image portion which is a portion in which a subject in a foreground is captured and a background image portion which is a portion in which a subject in a background farther than the foreground image portion is captured; a foreground correction unit configured to correct the foreground image portion; and an inconsistency correction unit configured to correct an inconsistent portion caused by the correction of the foreground image portion by the foreground correction unit.

Here, the inconsistent portion means a portion in which visual elements such as the shape, size, and color of the subject are inconsistent. For example, when the foreground image portion is completely made transparent is performed as the foreground correction, since the foreground image portion in the input image will be a non-image portion, the entire foreground image portion will be an inconsistent portion. According to the above configuration, a subject in the foreground captured in a close-up shot is less noticeable by the correction of the foreground correction unit, and the inconsistent portion caused by the correction of the foreground correction unit is corrected by the inconsistency correction unit. As a result, it is possible to alleviate the user's sense of strangeness due to the inconsistent portion.

In the image processing device according to the present technology described above, the foreground-background classification unit may be configured to: classify the input image into the foreground image portion and the background image portion on the basis of ranging information of the subject in the input image.

By using the ranging information of the subject, it becomes possible to appropriately identify the foreground image portion or the background image portion.

In the image processing device according to the present technology described above, the foreground-background classification unit may be configured to: classify the input image into the foreground image portion and the background image portion on the basis of a difference in distance between subjects in the input image.

By performing classification based on the difference in distance, a portion with a large distance difference from a specific portion in the background, for example, a portion of the user's hand on the field of a stadium, which is likely to give the user a sense of strangeness, can be specified as the foreground image portion.

In the image processing device according to the present technology described above, the foreground-background classification unit may be configured to: classify the input image into the foreground image portion and the background image portion on the basis of an image analysis result of the input image.

As a result, there is no need to use a ranging sensor in classifying the input image into the foreground image portion and the background image portion.

In the image processing device according to the present technology described above, the foreground-background classification unit may be configured to: classify the input image into the foreground image portion and the background image portion on the basis of a result of object recognition processing performed on the input image.

In this way, it is possible to appropriately recognize in which part of the image an object that should be in the foreground or in the background exists.

In the image processing device according to the present technology described above, the foreground-background classification unit may be configured to: perform the object recognition processing using an image recognizer based on artificial intelligence.

If an image recognizer based on artificial intelligence is used, it becomes possible to appropriately set factors for object recognition, such as the types of objects that can be recognized and the accuracy of recognition, depending on how it learns.

In the image processing device according to the present technology described above, the foreground-background classification unit may be configured to: perform image analysis based on template matching to classify the input image into the foreground image portion and the background image portion.

As a result, there is no need to perform learning based on artificial intelligence in classifying the input image into the foreground image portion and the background image portion.

In the image processing device according to the present technology described above, the foreground correction unit may be configured to: make at least a portion of the foreground image portion transparent or reduced in size as the correction of the foreground image portion.

By performing transparency and reduction processing as described above, it is possible to make the subject in the foreground less noticeable.

In the image processing device according to the present technology described above, the inconsistency correction unit may be configured to: perform correction using an image of an overlapping portion of the background image portion in a past frame overlapping a current inconsistent portion which is the inconsistent portion in a current frame as correction of the current inconsistent portion.

For example, if the subject in the foreground is a spectator seated in the audience seats, the subject may move, and the background portion that is not visible in the current inconsistent portion in the current frame may be visible as the overlapping portion in the past frame. According to the above configuration, if there is such an overlapping portion with the current inconsistent portion in the background image portion of the past frame, the current inconsistent portion is corrected using the image of the overlapping portion.

In the image processing device according to the present technology described above, the inconsistency correction unit may be configured to: generate a last value holding image which is an image holding a pixel value when the input image is last classified into the background image portion in a period earlier than at least a current frame for each pixel of the input image and perform correction of the current inconsistent portion using the last value holding image. As a result, if an overlapping portion with the current inconsistent portion is present in the past background image portion, the pixel values of the pixels of the overlapping portion when the input image is last classified into the background image portion are used for correction of the current inconsistent portion.

In the image processing device according to the present technology described above, the inconsistency correction unit may be configured to: generate the last value holding image by performing processing of holding a pixel value of a pixel classified into the background image portion and maintaining an existing holding value for a pixel classified into the foreground image portion over a plurality of frames of the input image.

In this way, it is possible to appropriately generate the last value holding image.

In the image processing device according to the present technology described above, the inconsistency correction unit may be configured to: interpolate pixel values using the image of the overlapping portion for portion of the current inconsistent portion where the overlapping portion is not present.

As a result, even if the overlapping portion with the current inconsistent portion is only a portion, it is possible to appropriately interpolate the pixels other than the overlapping portion using the image of the overlapping portion.

In the image processing device according to the present technology described above, the foreground-background classification unit may be configured to: change a size of a distance range in which the input image is classified into the foreground image portion so as to have a negative correlation with a distance between a display surface on which the input image is displayed and a user viewing an image displayed on the display surface.

When the distance between the display surface and the user is short, since the subject in the image will appears larger to the user, the distance range of the foreground that the user feels a sense of strangeness with is also widened. Therefore, as described above, the size of the distance range in which the input image is classified as the foreground image portion is changed so as to have a negative correlation with the distance between the display surface and the user. That is, the shorter the distance, the larger the distance range in which the input image is classified as the foreground image portion.

In the image processing device according to the present technology described above, the foreground-background classification unit may be configured to: change a size of a distance range in which the input image is classified as the foreground image portion so as to have a positive correlation with a size of a display area of the input image.

When the display area for displaying the input image is large, since the subject in the image will appear larger to the user, the distance range of the foreground that the user feels a sense of strangeness with is also widened. Therefore, the size of the distance range in which the input image is classified as the foreground image portion as described above is changed so as to have a positive correlation with the size of the display area. That is, the larger the display area, the larger the distance range in which the input image is classified as the foreground image portion.

An image processing method according to the present technology includes: classifying an input image into a foreground image portion which is a portion in which a subject in a foreground is captured and a background image portion which is a portion in which a subject in a background farther than the foreground image portion is captured; correcting the foreground image portion; and correcting an inconsistent portion caused by the correction of the foreground image portion. Such an image processing method can also provide the same effects as the image processing device according to the present technology described above.

A projector device according to the present technology includes: a foreground-background classification unit configured to classify an input image into a foreground image portion which is a portion in which a subject in a foreground is captured and a background image portion which is a portion in which a subject in a background farther than the foreground image portion is captured; a foreground correction unit configured to correct the foreground image portion; an inconsistency correction unit configured to correct an inconsistent portion caused by the correction of the foreground image portion by the foreground correction unit; and a projection unit configured to generate a reproduction image based on an image of the inconsistent portion corrected by the inconsistency correction unit and project the reproduction image onto a projection surface.

Such a projector device can also provide the same effects as the image processing device according to the present technology described above.

BRIEF DESCRIPTION OF DRAWINGS

FIGS. 3A and 3B are explanatory diagrams of foreground correction in the embodiment.

FISG. 7A and 7B are explanatory diagrams of correction of inconsistent portions in the embodiment.

Figure 8:
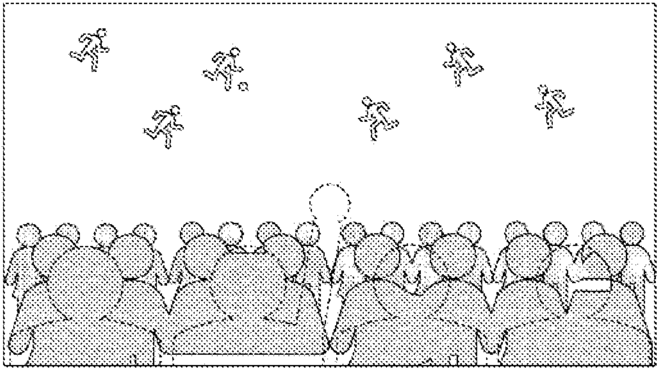

FIG. 8 is a diagram illustrating image contents of an inconsistent portion after correction.

Figure 9:
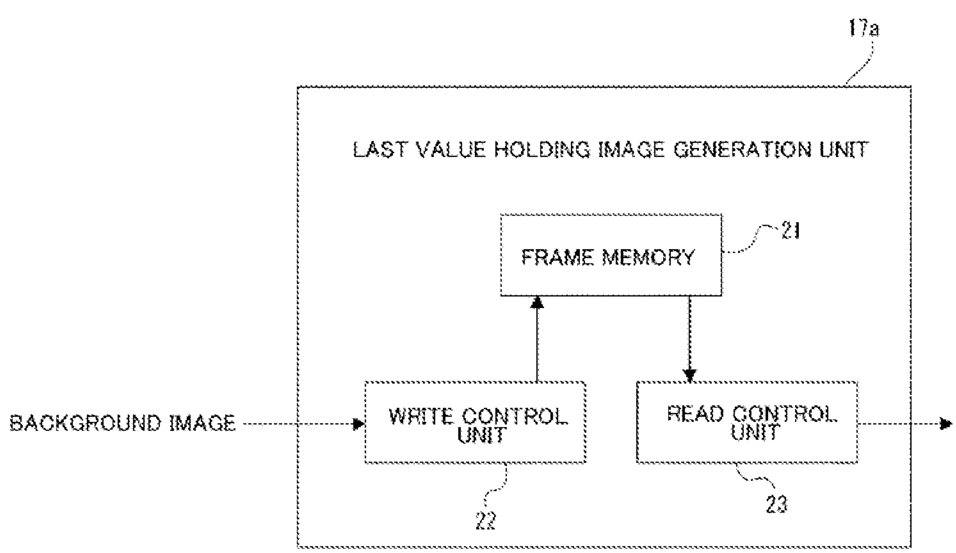

FIG. 9 is a block diagram showing an internal configuration example of a last value holding image generation unit in the embodiment.

Figure 10:
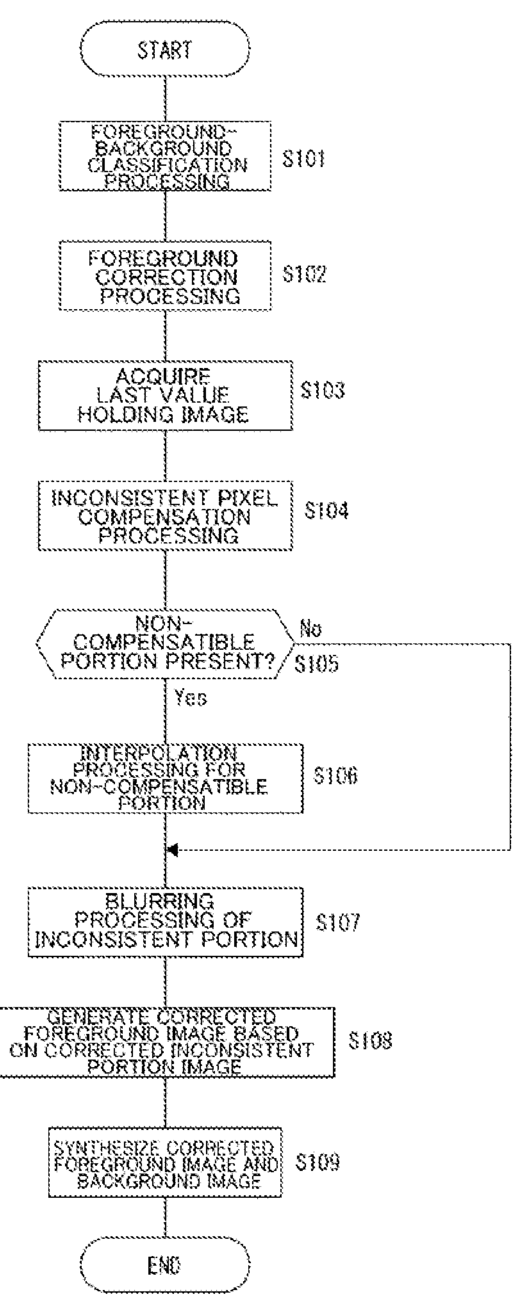

FIG. 10 is a flowchart showing a specific processing procedure example for realizing image correction as the first embodiment.

FIG. 11 is a diagram showing functional blocks of an image processing unit as a modification example related to foreground-background classification.

Figure 12A:
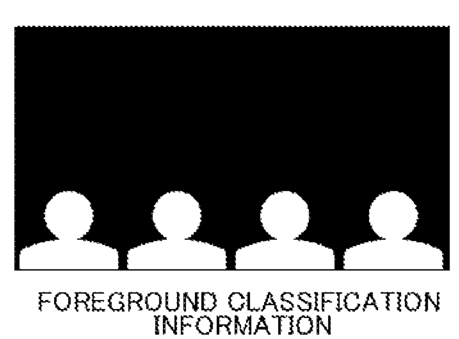
Figure 12B:
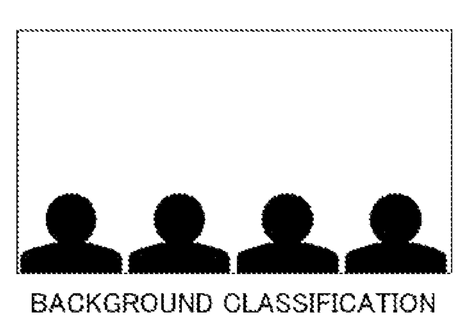

FIGS. 12A and 12B are diagrams showing examples of foreground classification information and background classification information.

Figure 13:
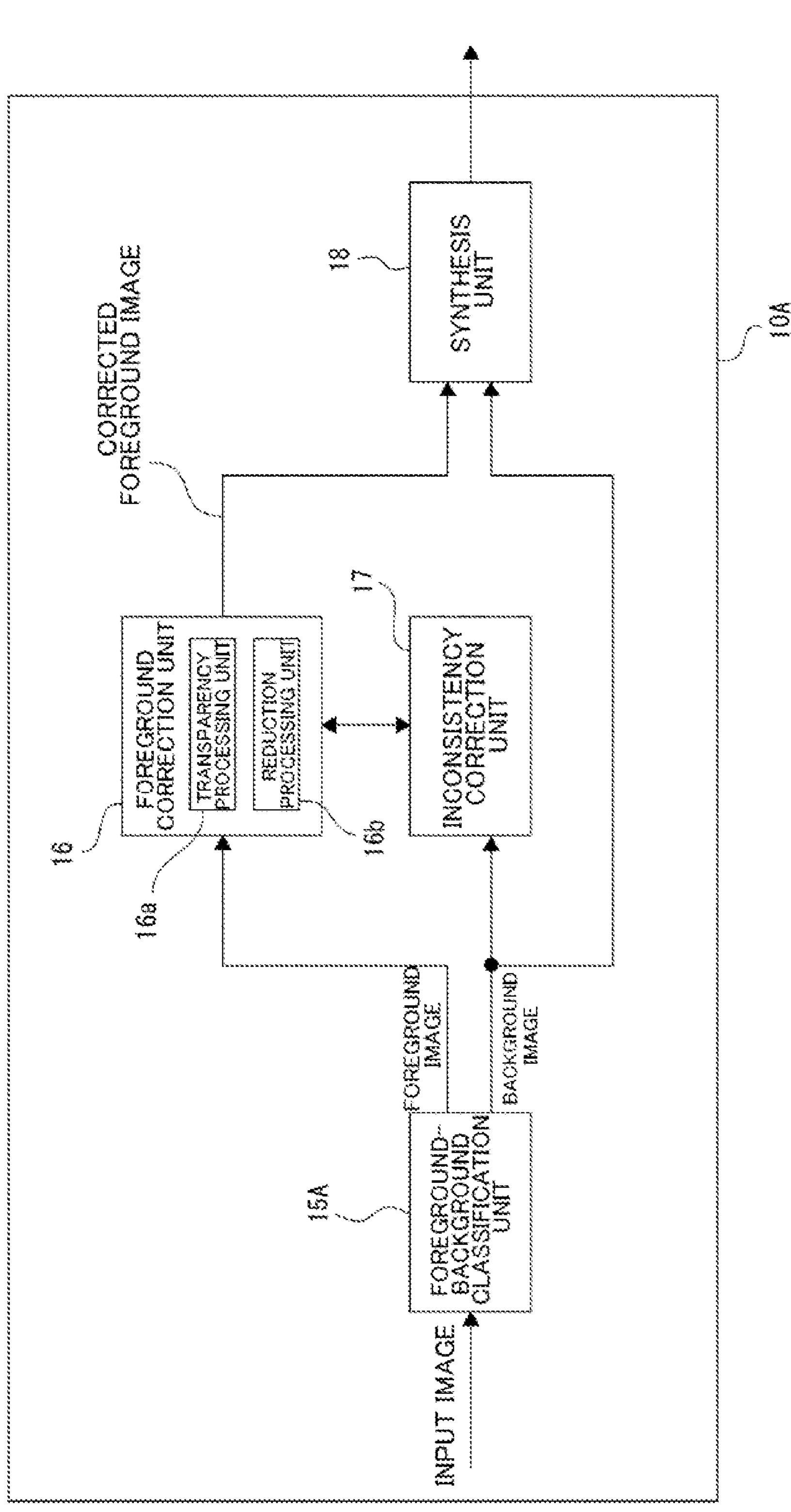

FIG. 13 is a functional block diagram showing the functional configuration of an image processing unit as a second embodiment.

Figures 14A, 14B:
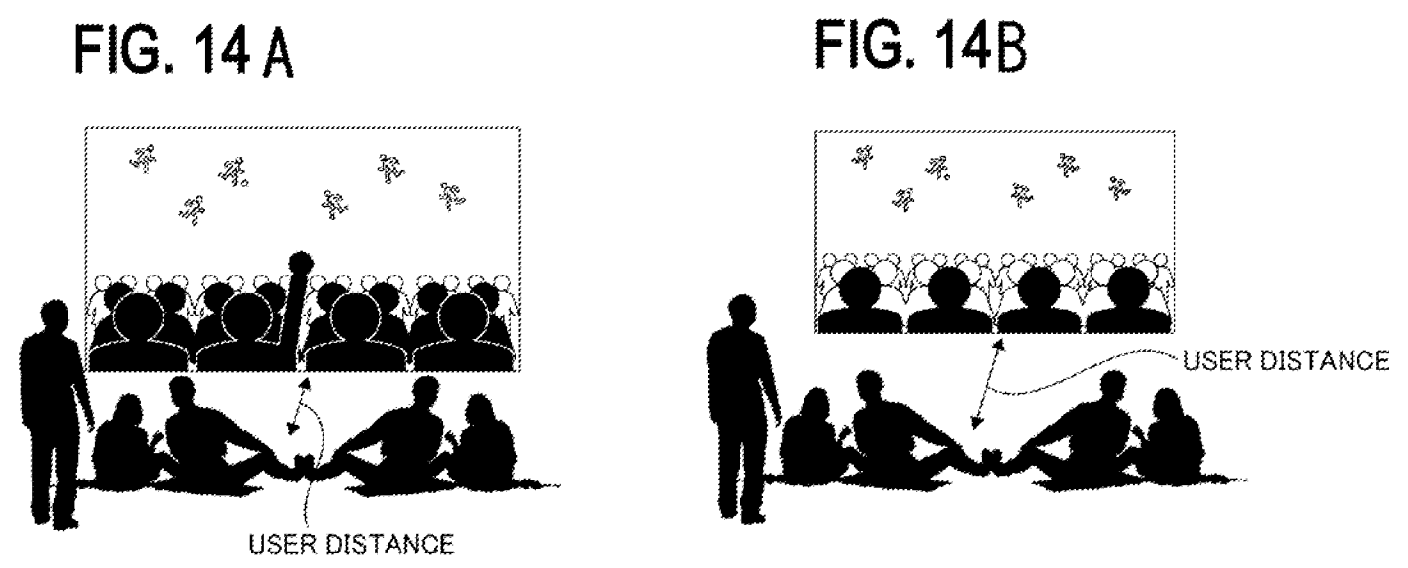

FIGS. 14A and 14B are explanatory diagrams of a first example in a third embodiment.

Figure 15:
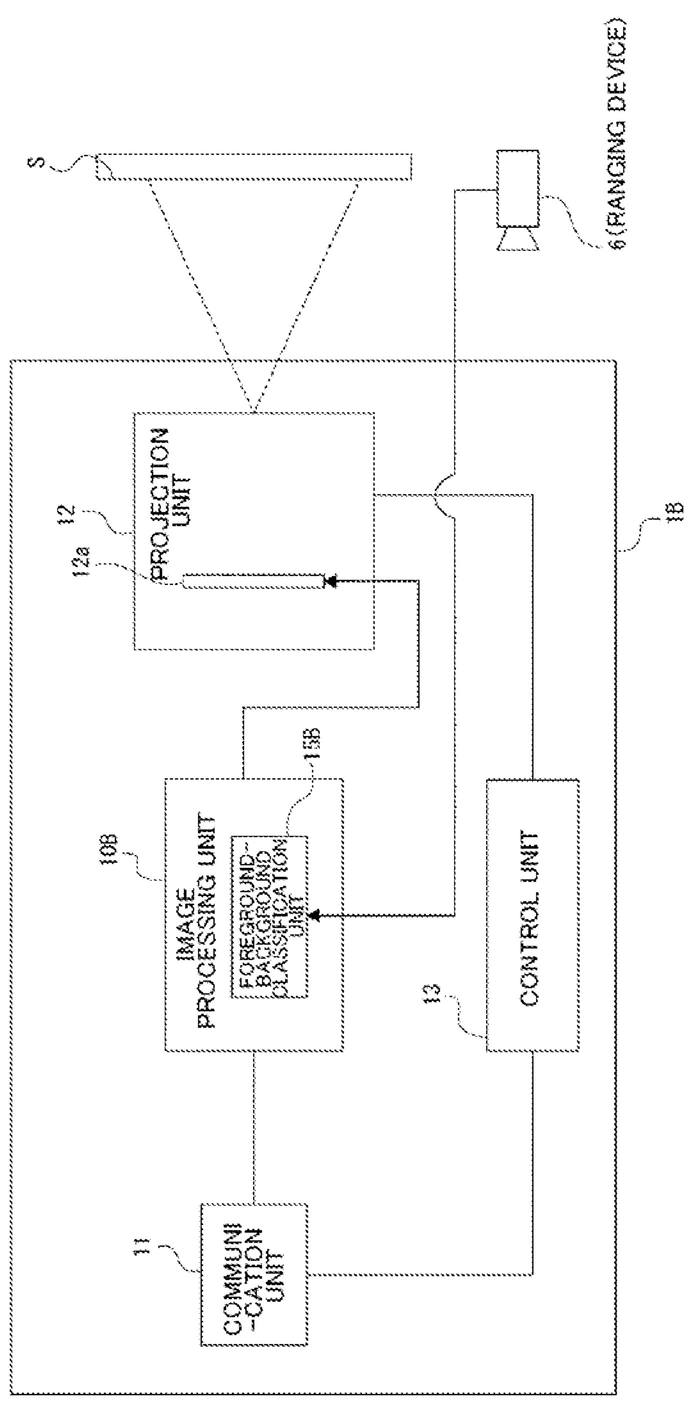

FIG. 15 is a block diagram for explaining the configuration of a projector device as a first example in the third embodiment.

Figures 16A, 16B:
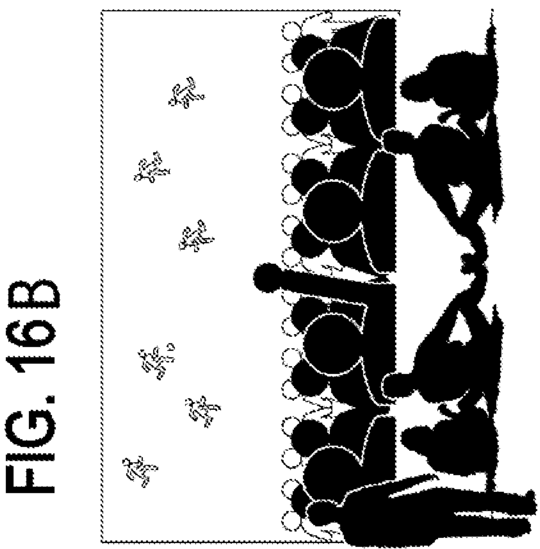

FIGS. 16A and 16B are explanatory diagrams of a second example in the third embodiment.

Figure 17:
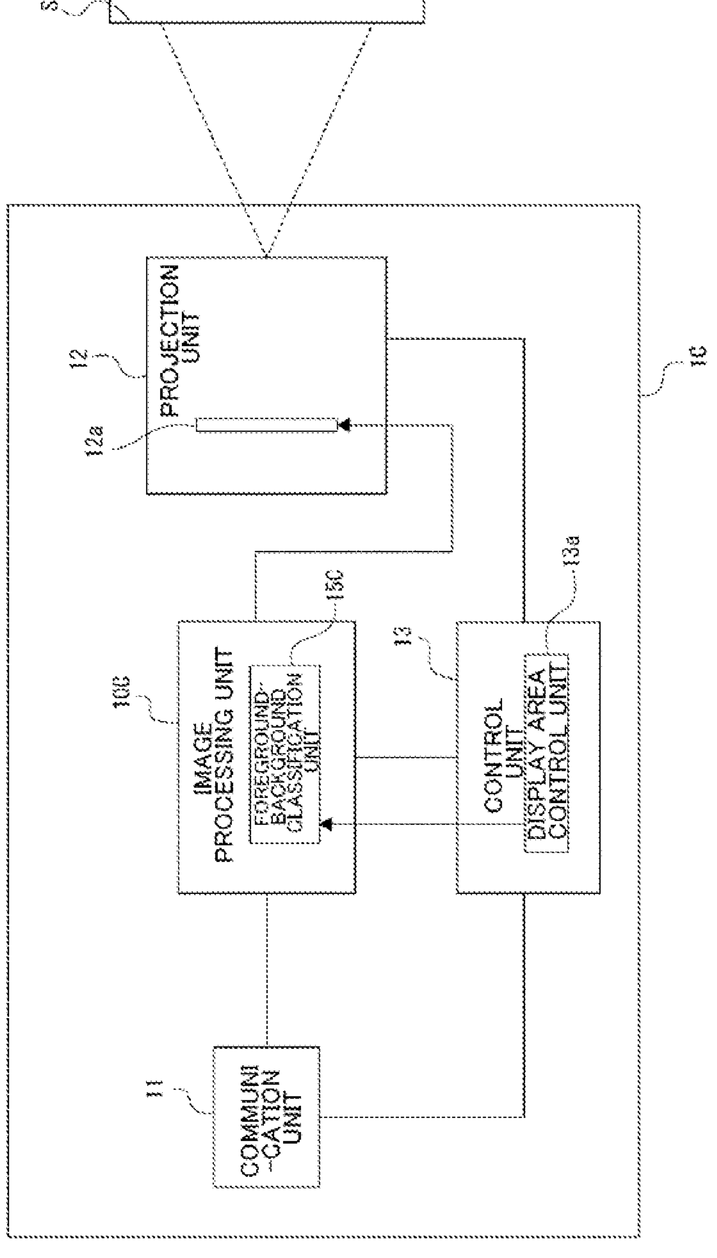

FIG. 17 is a block diagram for explaining the configuration of a projector device as a second example in the third embodiment.

Figures 18A, 18B:
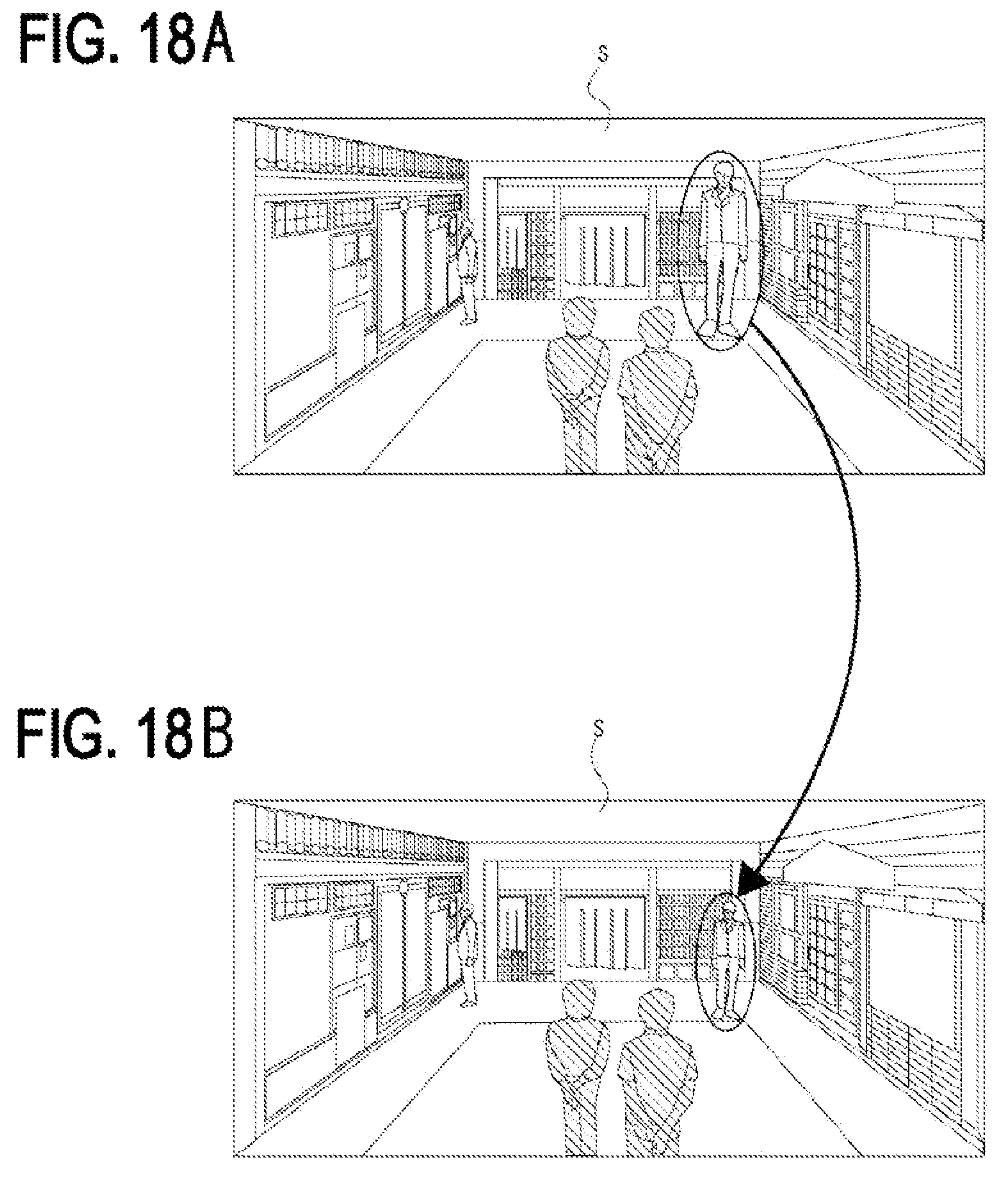

FIGS. 18A and 18B are explanatory diagrams of an example of life-size processing.

Figures 19A, 19B:
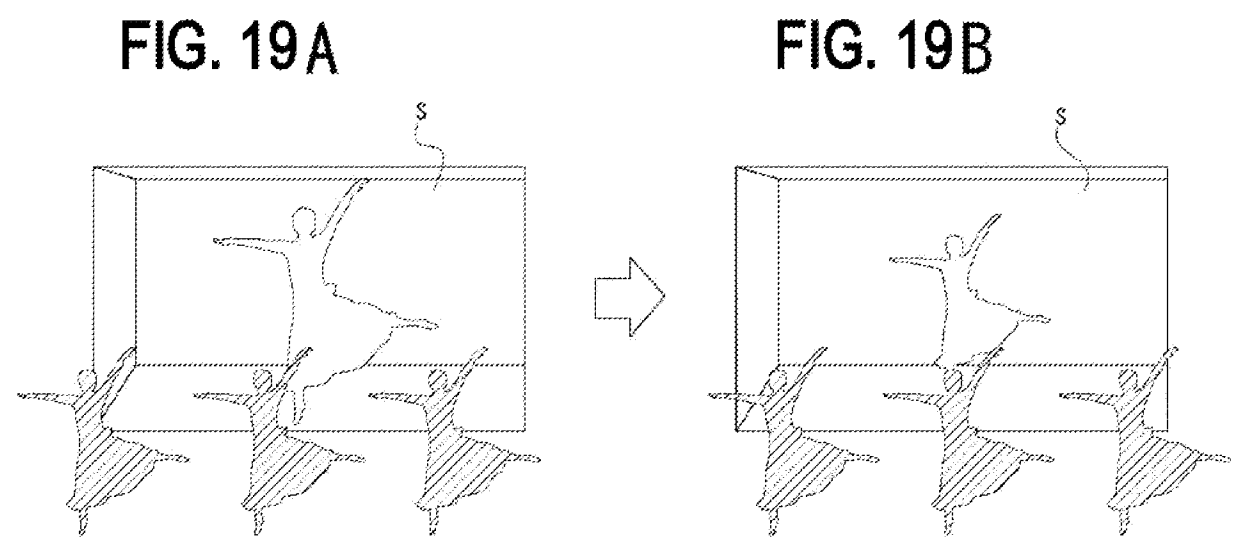

FIGS. 19A and 19B are explanatory diagrams of another example of life-size processing.

Figure 20:
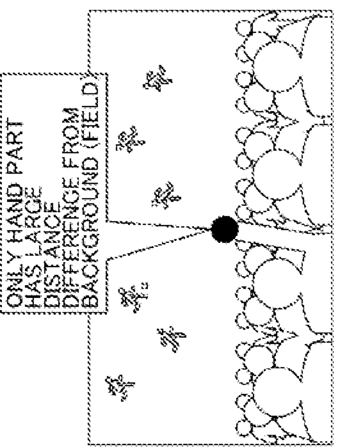
Figure 20:
Figure 20:
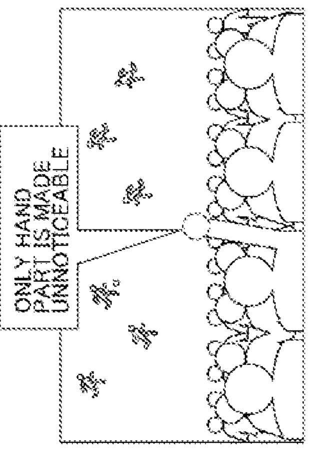

FIG. 20 is an explanatory diagram of a modification example in which foreground-background classification is performed on the basis of the distance difference between subjects.

DESCRIPTION OF EMBODIMENTS

Hereinafter, embodiments will be described in the following order.

1. First Embodiment
(1-1. System Configuration)
(1-2. Image Processing Device as Embodiment)
(1-3. Image Correction as Embodiment)
(1-4. Processing Procedure)
(1-5. Modification Example Related to Foreground-Background Classification)
2. Second Embodiment
3. Third Embodiment
(3-1. First Example)
(3-2. Second Example)
<4. Modification Example>
<5. Summary of Embodiment>
<6. Present Technology>

1. First Embodiment (1-1. System Configuration)

Figure 1:
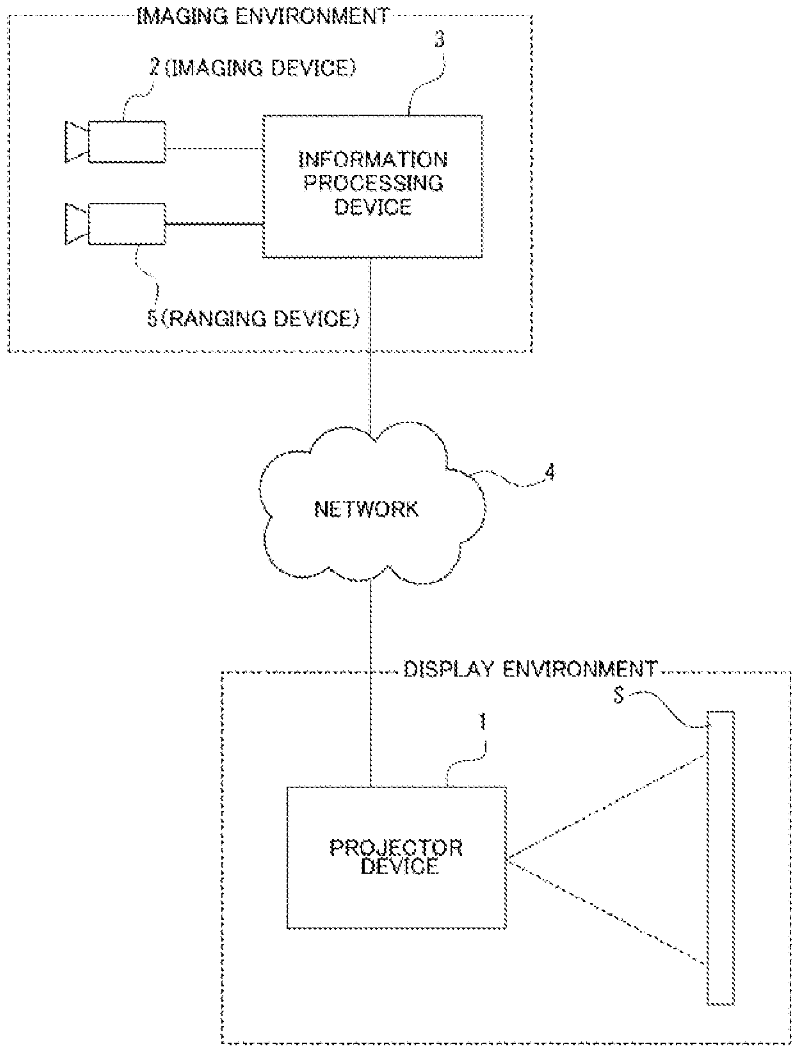
FIG. 1 is a diagram showing a configuration example of an image display system as an embodiment according to the present technology.

FIG. 1 shows a configuration example of an image display system 100 as an embodiment according to the present technology.

In this example, the image display system 100 is a system applied to public viewing and group viewing as described above. In these viewing styles such as public viewing and group viewing, captured images of competition sports such as soccer, baseball, and basketball, and events such as concerts are displayed to users as spectators at remote venues.

The "imaging environment" in the figure is an environment for capturing the state of the event, and an imaging device 2 is arranged as shown in the figure. The imaging device 2 is configured as a digital camera device having a solid-state imaging element such as a CCD (Charge Coupled Devices) sensor or a CMOS (Complementary Metal-Oxide-Semiconductor) sensor, and obtains a captured image as digital data. In this example, the imaging device 2 obtains captured images as moving images.

Note that the number of imaging devices 2 is not limited to one, and a plurality of imaging devices may be arranged.

The "display environment" is an environment for displaying captured images of an event obtained in the imaging environment, and exists in a remote location, such as a stadium or a concert hall, where the event is held. A device for displaying the captured image is arranged in the display environment. Specifically, in this example, a projector device 1 is arranged as a device for the display, and a user in the display environment (that is, a spectator at a remote venue) sees the projector device 1 as a projection surface such as a screen. The image projected on S allows a view of the event venue at a distance.

In this example, the imaging environment includes an information processing device 3 for transmitting an image captured by the imaging device 2 to an external device (especially a projector device 1 in this example) via a network 4.

Here, the network 4 is, for example, a communication network such as the Internet or a LAN (Local Area Network). The information processing device 3 is configured of a computer device having a communication function, such as a personal computer.

As will be described later, in the image display system 100 of this example, the projector device 1 classifies the image captured by the imaging device 2 into a foreground image portion and a background image portion. Here, the foreground image portion is a portion in which a subject in the foreground in the input image is captured, and the background image portion is a portion in which a subject in a background farther than the foreground image portion is captured.

In order to make it possible to classify the input image into the foreground image portion and the background image portion as described above, a ranging device 5 is provided in the imaging environment of this example. The ranging device 5 is configured as a device that performs ranging by a known ranging method such as a ToF (Time of Flight) method, a structured light method, or a stereo method. In this example, the ranging device 5 is configured to acquire distance image data (depth image data) as two-dimensional ranging data.

In this example, the field of view (angle of view) for ranging by the ranging device 5 covers the field of view of the imaging device 2. The ranging device 5 is capable of measuring the distance of each subject present within the field of view of the imaging device 2.

In this example, the imaging device 2 and the ranging device 5 attach a time code to each frame of the captured image and the distance image, respectively, so that time synchronization (frame synchronization) can be established between both images.

The information processing device 3 acquires the captured image and the distance image to which the time code is attached in this way from the imaging device 2 and the ranging device 5, respectively, and transmits them to the projector device 1 via the network 4.

Note that the function of the information processing device 3, specifically, the function of acquiring an image captured by the imaging device 2 and ranging data (distance image) obtained by the ranging device 5, and outputting them to a predetermined external device (the projector device 1 in this example) is realized not only by a single computer device but also by cooperation of a plurality of computer devices.

(1-2. Image Processing Device as Embodiment)

Figure 2:
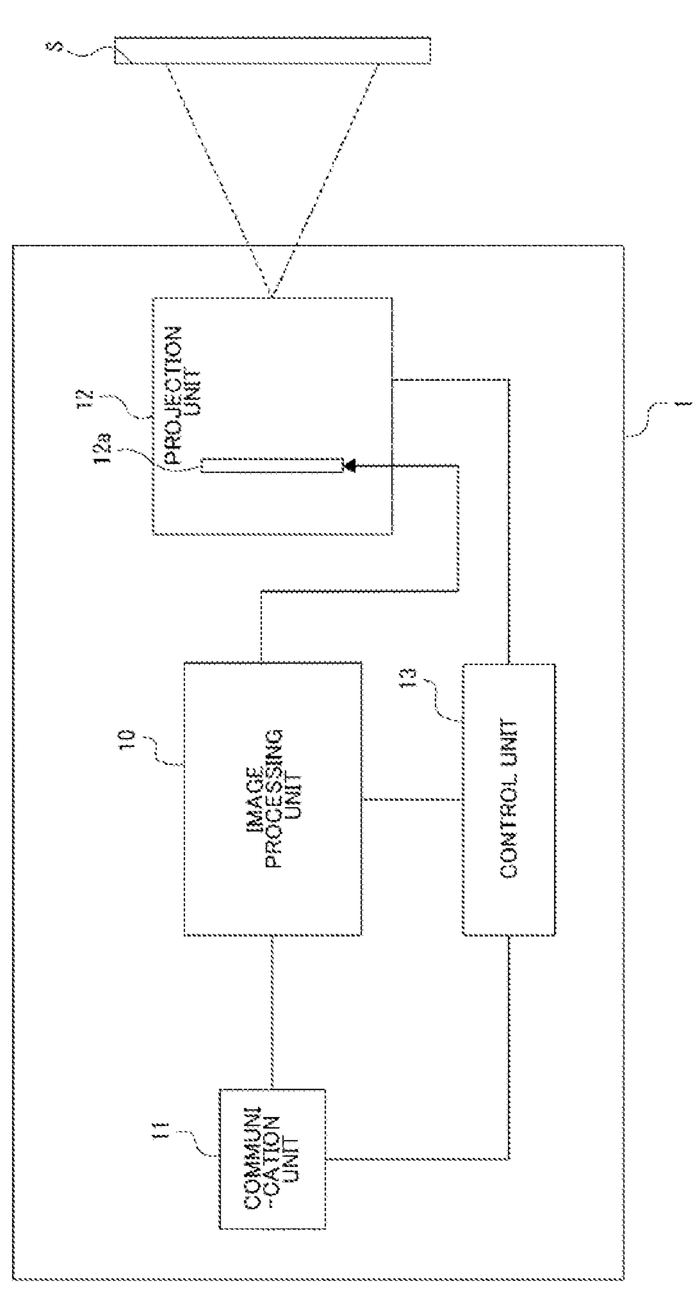
FIG. 2 is a block diagram for explaining an internal configuration example of a projector device having an image processing device as an embodiment.

FIG. 2 is a block diagram for explaining an internal configuration example of the projector device 1 including the image processing device as the embodiment. FIG. 2 also shows a projection surface S shown in FIG. 1 together with the internal configuration example of the projector device 1.

As illustrated in the figure, the projector device 1 includes an image processing unit 10, a communication unit 11, a projection unit 12 and a control unit 13.

The communication unit 11 performs communication processing via the network 4 shown in FIG. 1. Note that the communication unit 11 may be configured to be capable of performing wired or wireless communication with a peripheral device.

The image processing unit 10 is an embodiment of an image processing device according to the present technology, and is configured to perform classification of an image input via the communication unit 11 (input image: specifically, an image captured by the imaging device 2 in this example) into the foreground image portion and the background image portion, correction (image correction) of the foreground image portion (image correction), and correction of an inconsistent portion caused by the correction of the foreground image portion. The classification into the foreground image portion and the background image portion, and the correction of the foreground image portion and the inconsistent portion will be described later.

The projection unit 12 projects a reproduction image of the captured image that has been subjected to image processing such as the correction described above by the image processing unit 10 onto the projection surface S. Specifically, the projection unit 12 has a spatial light modulator 12*a* such as a liquid crystal panel, a light source (not shown), and a projection optical system including a projection lens and the like. The spatial light modulator 12*a* performs spatial light modulation such as spatial light intensity modulation on incident light from the light source on the basis of the captured image input from the image processing unit 10. Thus, a reproduction image of the captured image is generated. Then, the reproduction image thus generated is projected onto the projection surface S via the projection optical system.

The control unit 13 includes, for example, a microcomputer having a CPU (Central Processing Unit), a ROM (Read Only Memory), a RAM (Random Access Memory), and the like, and executes processing according to a program stored in the ROM, for example, to control the entire projector device 1.

For example, the control unit 13 controls data communication by the communication unit 11, instructs the image processing unit 10 to execute and end image processing, and performs various controls for the projection unit 12 (for example, the above-described light source ON/OFF instruction and various controls for correcting distortion of the projection image, and the like).

(1-3. Image Correction as Embodiment)

Figures 3A, 3B:
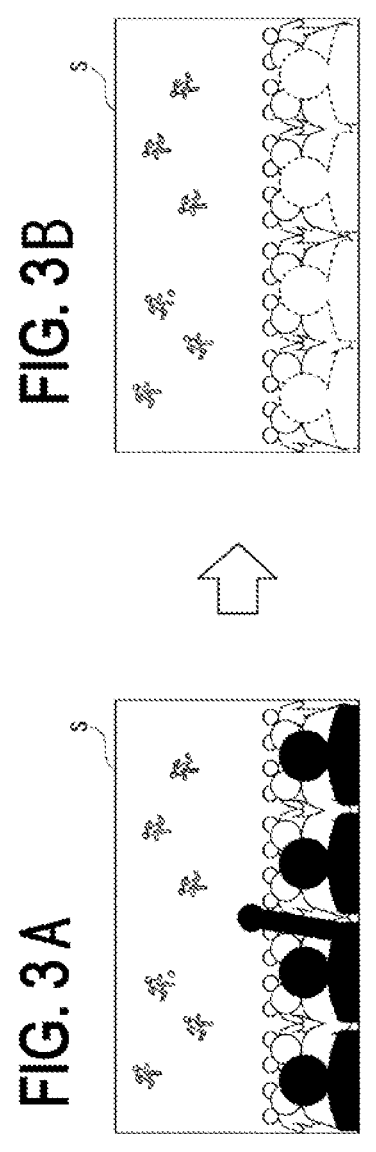

FIG. 3A shows an example of an image projected onto the projection surface S, that is, a display image on the projection surface S. Specifically, a display image when an image of an event such as a soccer match is captured by the imaging device 2 arranged in the audience seats is illustrated.

In this case, the captured image is an image in which the spectators at the event site are captured on the front side (the side closer to the imaging device 2), and the competition field and athletes and the like on the competition field are captured on the back side.

At this time, the subject captured in the foreground in the captured image, particularly the subject positioned in the frontmost row, is the subject closest to the imaging device 2. Depending on the positional relationship with the imaging device 2, the subject will be projected huge in the captured image (display image).

It is effective to display spectator in enhancing the sense of realism. However, as described above, if the subject is projected in a large size, the user will rather feel a sense of strangeness, and the sense of immersion in the image content will be lost.

Therefore, in the present embodiment, as shown by the transition from FIG. 3A to FIG. 3B, correction (foreground correction) is performed to make the subject in the foreground, which is likely to be displayed large, less noticeable. For example, the subject in the foreground is subjected to transparency processing or reduction processing.

However, when correction processing such as transparency and reduction processing is performed, an inconsistent portion occurs in the image due to the correction.

The inconsistent portion mentioned herein means a portion in which visual elements such as the shape, size, and color of the subject are inconsistent. For example, if the foreground image portion is completely made transparent as the foreground correction, since the foreground image portion in the input image will be a non-image portion, the entire foreground image portion will be an inconsistent portion. Alternatively, when the subject in the foreground is reduced in size as the foreground correction, the difference portion between the subjects before and after reduction will be a non-image portion, and the non-image portion will be an inconsistent portion.

Therefore, in the present embodiment, the above-described foreground correction is performed, and the inconsistent portion caused by the foreground correction is also corrected.

In the projector device 1, the image processing unit 10 performs the correction processing for the foreground and the correction processing for the inconsistent portion.

Figure 4:
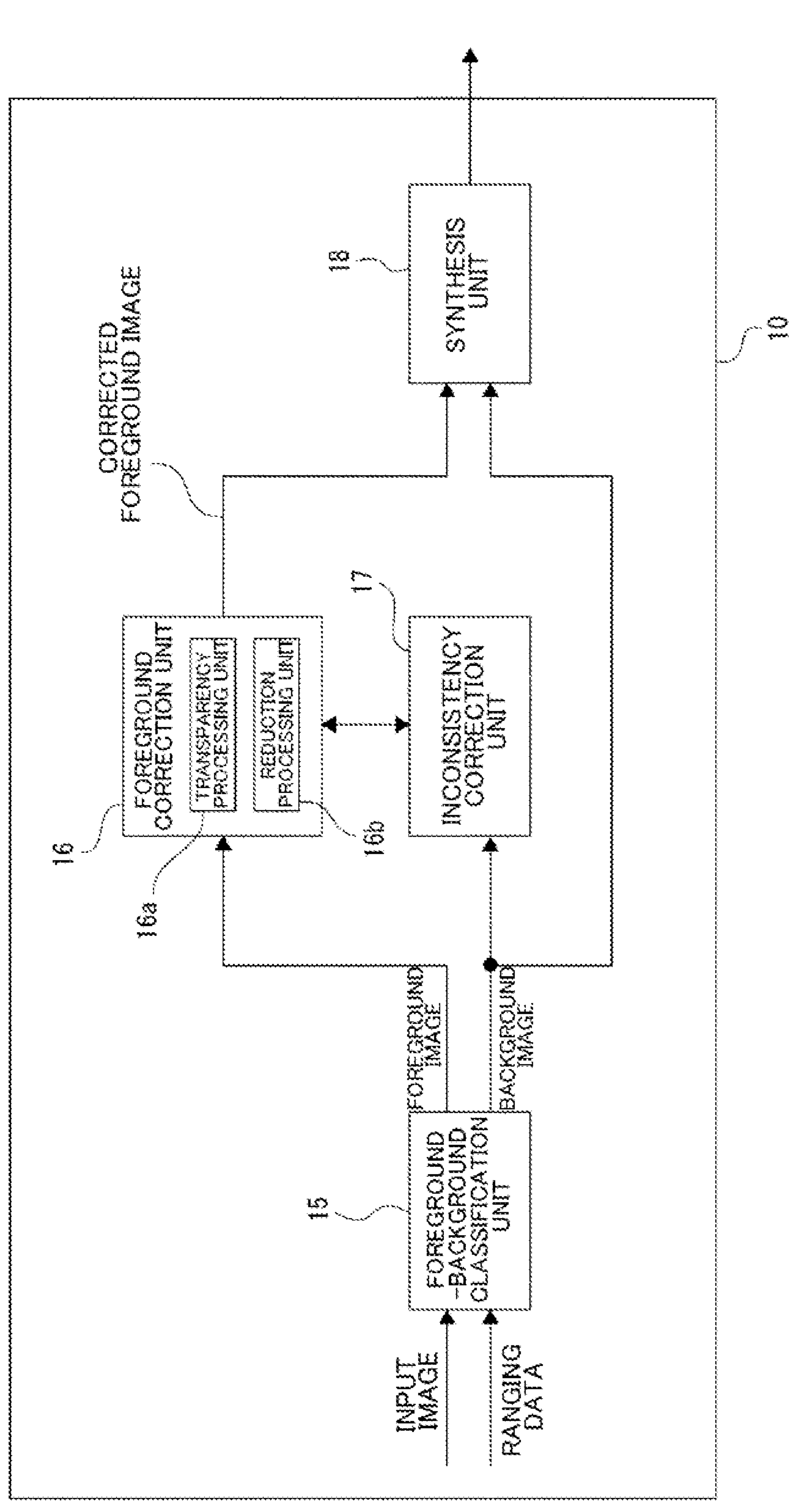
FIG. 4 is a functional block diagram showing the functional configuration of an image processing unit according to a first embodiment.

FIG. 4 is a functional block diagram showing the functional configuration of the image processing unit 10.

As shown in the figure, the image processing unit 10 includes a foreground-background classification unit 15, a foreground correction unit 16, an inconsistency correction unit 17, and a synthesis unit 18.

The captured image from the imaging device 2 and the ranging data (distance image data in this example) from the ranging device 5 are input to the foreground-background classification unit 15 via the communication unit 11 shown in FIG. 2. As described above, a time code is attached to the captured image and the distance image, and the foreground-background classification unit 15 can synchronize the frames of the captured image and the distance image.

The foreground-background classification unit 15 classifies the input image as the captured image into a foreground image portion and a background image portion.

Specifically, the foreground-background classification unit 15 in this example classifies a portion of the captured image in which the distance value is equal to or less than a predetermined value as the foreground image portion and classifies the other portions as the background image portion on the basis of the data of the distance image input as the ranging data.

The foreground-background classification unit 15 outputs the image of the portion of the input captured image classified as the foreground image portion as a foreground image, and outputs the image of the portion classified as the background image portion as a background image.

In the above example, as foreground-background classification, an example in which the foreground image portion is determined, and then, the portion other than the foreground image portion is classified as the background image portion has been illustrated. Conversely, it is also possible to classify the portion other than the background image portion as the foreground image portion after determining the background image portion.

In the above-described example, an example is given in which foreground-background classification is performed on the basis of ranging data, but it is not essential to use ranging data for foreground-background classification. This will be explained again later.

The foreground correction unit 16 corrects the foreground image output by the foreground-background classification unit 15 to make the subject less noticeable. As described above, transparency or reduction processing may be considered as the foreground correction. In the figure, the function of making an image transparent is illustrated as a transparency processing unit 16*a*, and the function of reducing an image is illustrated as a reduction processing unit 16*b*.

In the following explanation, it is assumed that the processing for making the subject in the foreground less noticeable is the transparency processing. In this example, the transparency processing is processing of maximizing the transparency of the target image portion (that is, completely erasing the portion), but the setting of the transparency is arbitrary.

Note that processing for reduction will be explained later.

The foreground correction unit 16 outputs the image of the inconsistent portion caused by the correction to the inconsistency correction unit 17 as an "inconsistent portion image". Since the above-described transparency processing is performed as the foreground correction, the inconsistent portion image here is a foreground image that has been subjected to the transparency processing.

The inconsistency correction unit 17 corrects the inconsistent portion caused by the correction of the foreground image portion by the foreground correction unit 16.

In this example, the inconsistency correction unit 17 corrects the inconsistent portion image output by the foreground correction unit 16 (that is, the transparent foreground image in this example) on the basis of the background image output by the foreground-background classification unit 15.

Figure 5:
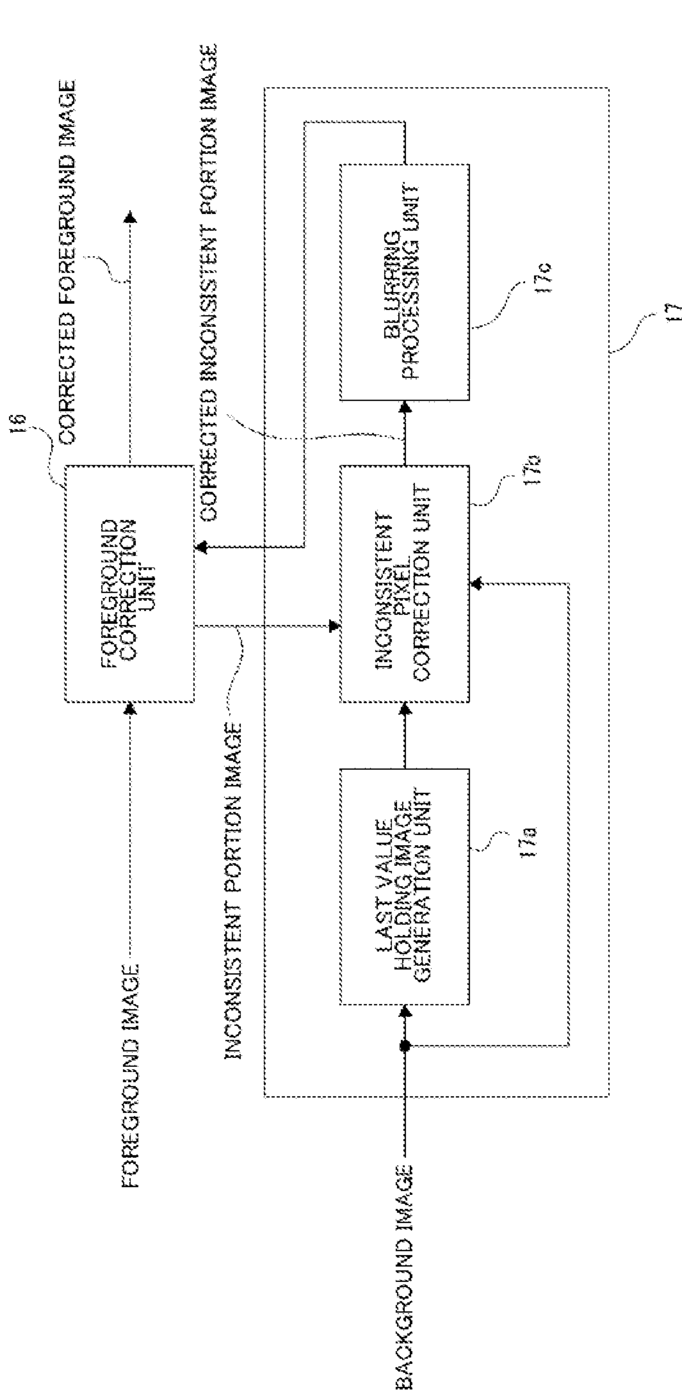
FIG. 5 is an explanatory diagram of functions of an inconsistency correction unit according to the embodiment.

FIG. 5 is an explanatory diagram of the functions of the inconsistency correction unit 17, and shows the foreground correction unit 16 together with functional blocks showing the functional configuration of the inconsistency correction unit 17.

As shown in the figure, the inconsistency correction unit 17 includes a last value holding image generation unit 17*a*, an inconsistent pixel correction unit 17*b*, and a blurring processing unit 17*c*.

Here, the inconsistency correction unit 17 corrects the inconsistent portion for each frame of the input image (captured image) as a moving image.

Here, hereinafter, the frame to be processed for the correction of the foreground image and the correction of the inconsistent portion caused by the correction of the foreground image is referred to as the "current frame". In addition, the inconsistent portion in the current frame is referred to as "current inconsistent portion".

The inconsistency correction unit 17 in this example performs correction using the image of the overlapping portion with the current inconsistent portion in the background image of the past frame as the correction of the current inconsistent portion.

For example, if the subject in the foreground is a spectator seated in the audience seats, the subject may move, and the background portion that is not visible in the current inconsistent portion in the current frame may be visible as the overlapping portion in the past frame. Therefore, the correction accuracy of the inconsistent portion is improved using the image of the overlapping portion in the past frame (that is, the image of the portion that was actually visible in the past).

In this example, in order to hold the image of the overlapping portion with the current inconsistent portion in the past background image as described above, the last value holding image generation unit 17*a* generates the last value holding image. The last value holding image is an image that holds the pixel values when the input image is last classified into the background image portion in a period earlier than at least the current frame.

An example of a technique for correcting an inconsistent portion using such a last value holding image will be described with reference to FIGS. 6A, 6B and 6C to 8.

Figures 6A, 6B, 6C:
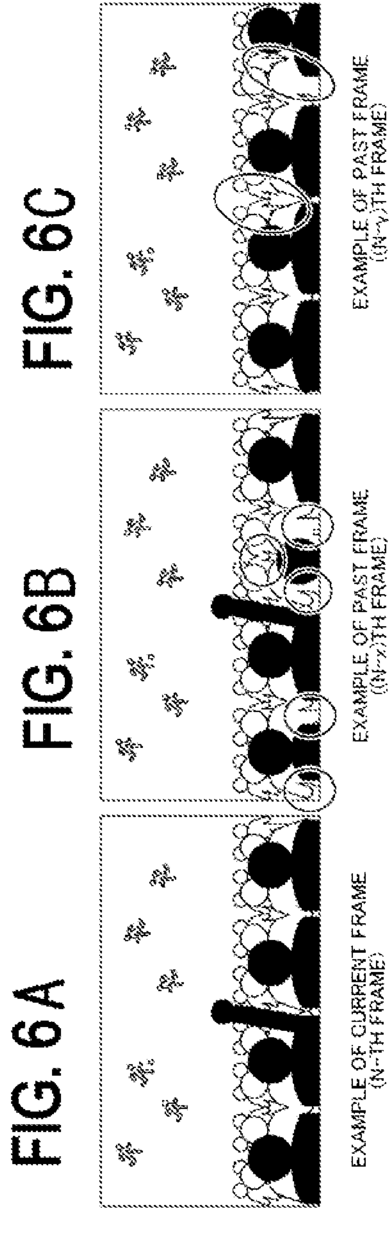
FIGS. 6A, 6B and 6C are diagrams illustrating image contents of a current frame and past frames.

FIGS. 6A, 6B and 6C are diagrams illustrating the image contents of the current frame and past frames. FIG. 6A shows the image contents of the current frame (assumed to be the N-th frame), FIG. 6B shows the image contents of the (N-x)th frame, which is the frame x frames before the current frame, and FIG. 6C shows the image contents of the (N-y)th frame, which is the frame y frames before the current frame (where y>x).

In each of FIGS. 6A to 6C, the black-painted portions represent the portions classified as foreground images in the respective frames.

In FIGS. 6B and 6C, circled portions are portions of the background image that are not visible in the current frame because they are blocked by the subject in the foreground image. In other words, the circled portions are the overlapping portions with the current inconsistent portion in the background image of the past frame.

By using the overlapping portion with the current inconsistent portion in the background image of the past frame, the background portion that is invisible in the current frame because it is blocked by the current inconsistent portion (that is, the entire foreground image in this example) can be compensated.

Figure 7A:
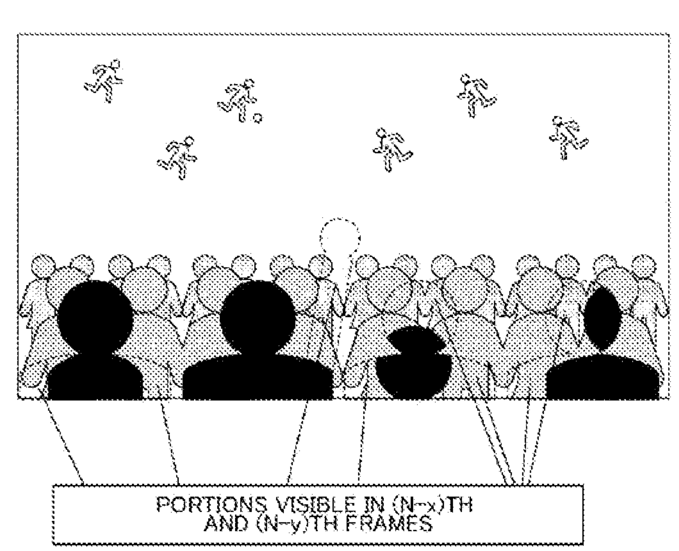

In FIG. 7A, when the current frame and the past frame illustrated in FIGS. 6A, 6B and 6C are obtained, the portion of the current inconsistent portion that can be compensated with the background image in the past frame (FIGS. 6B and 6C) is represented by a dotted line.

Figure 7B:
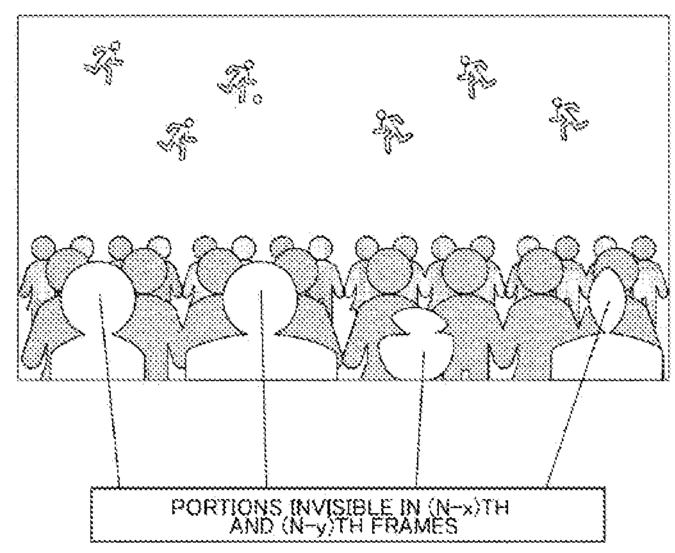

On the other hand, in FIG. 7B, the white portion surrounded by a solid line (same as the black-painted portion in FIG. 7A) represents the portion that cannot be compensated with the past background images of FIGS. 6B and 6C.

In this example, for a portion that cannot be compensated with a past background image, that is, a portion of the current inconsistent portion where the above-described overlapping portion does not exist, pixel values are interpolated using the image of the overlapping portion.

As a specific example of interpolation, for example, a method of copying pixel values of adjacent pixels can be used. For example, the pixel values of the left or right adjacent pixels are copied.

Note that the method of interpolation is not particularly limited. For example, a method of interpolating the pixel value of a pixel to be interpolated using the pixel values of four pixels vertically and horizontally adjacent to the pixel to be interpolated, or eight pixels vertically, horizontally and diagonally adjacent to the pixel to be interpolated can be used.

FIG. 8 shows an example of the image contents of the current inconsistent portion obtained by performing the correction of the inconsistent portion as described above, that is, the pixel compensation using the overlapping portion of the past background image with the current inconsistent portion, and the interpolation of the portion that could not be compensated with the overlapping portion. In the figure, the portion indicated by the dotted line represents the current inconsistent portion after the correction (in this example, since the entire area of the foreground image is made transparent, it has the same shape and size as the foreground image). The other portion becomes the background image of the current frame.

Note that FIG. 8 illustrates the image contents when the pixel values of the pixels adjacent to the left side are copied in the interpolation processing described above as the image contents of the current inconsistent portion after the correction.

As can be seen with reference to FIG. 8, by performing the above-described correction processing for the inconsistent portion, it is possible to make the inconsistent portion due to the foreground correction less noticeable. Therefore, it is possible to alleviate the user's sense of strangeness caused by the inconsistent portion, and thus, to alleviate the user's sense of strangeness caused by the foreground correction.

FIG. 9 is a block diagram showing an example of the internal configuration of the last value holding image generation unit 17*a*.

As shown in the figure, the last value holding image generation unit 17*a* includes a frame memory 21, a write control unit 22, and a read control unit 23.

A background image is input to the write control unit 22 for each frame. The write control unit 22 performs the following processing for each frame. That is, processing of holding the pixel values of the pixels classified into the background image among the pixels constituting one frame in the frame memory 21, and maintaining the existing values (that is, the already-held pixel values) held in the frame memory 21 for the pixels classified into the foreground image (image portions other than the background image). Specifically, for the pixels classified into the background image, the pixel values of the corresponding pixels in the frame memory 21 are overwritten with the pixel values of the pixels classified into the background image. For the pixels classified into the foreground image, the pixel values of the corresponding pixels in the frame memory 21 are not overwritten but are maintained as they are.

By performing such write control over a plurality of frames, the last value holding image is held in the frame memory 21.

The read control unit 23 reads out the last value holding image held in the frame memory 21 for each frame and outputs the readout image to the inconsistent pixel correction unit 17*b* shown in FIG. 5.

In FIG. 5, the inconsistent pixel correction unit 17*b* performs the correction processing of the inconsistent portion using the method described with reference to FIGS. 6 to 8, that is, the pixel compensation using the overlapping portion of the past background image with the current inconsistent portion, and the interpolation of the portion that could not be compensated with the overlapping portion, on the basis of the inconsistent portion image input from the foreground correction unit 16, the last value holding image input from the last value holding image generation unit 17*a*, and the background image of the current frame output by the foreground-background classification unit 15 (FIG. 4). The inconsistent pixel correction unit 17*b* uses the background image from the foreground-background classification unit 15 as necessary in this interpolation processing.

Hereinafter, the image of the inconsistent portion (the current inconsistent portion) that has been subjected to the correction processing by the inconsistent pixel correction unit 17*b* will be referred to as a "corrected inconsistent portion image".

The blurring processing unit 17*c* performs blurring processing on the corrected inconsistent portion image input from the inconsistent pixel correction unit 17*b*. The blurring processing is processing that imparts visual blur to a target image. Specifically, blurring of edges (blurring of shape), blurring of colors, and the like can be mentioned. By performing this blurring processing, it is possible to make portions that have become inconsistent due to foreground correction less noticeable, thereby further alleviating the sense of strangeness.

The blurring processing unit 17c outputs the corrected inconsistent portion image subjected to the blurring processing to the foreground correction unit 16.

The foreground correction unit 16 replaces the image of the portion corresponding to the inconsistent portion in the foreground image with the corrected inconsistent portion image. The foreground image obtained by replacing the image of the portion corresponding to the inconsistent portion with the corrected inconsistent portion image is hereinafter referred to as a "corrected foreground image".

When the entire foreground image is made transparent as foreground correction as in this example, the inconsistent portion is the same as the foreground image, so the corrected foreground image is the corrected inconsistent portion image itself.

In FIG. 4, the synthesis unit 18 synthesizes the corrected foreground image obtained by the foreground correction unit 16 and the background image input from the foreground-background classification unit 15. That is, the two images are synthesized to obtain an image for one frame. The spatial light modulator 12a shown in FIG. 2 is driven on the basis of the one-frame image obtained by the synthesizing processing of the synthesis unit 18 in this manner. As a result, a reproduction image of the synthesized image is projected onto the projection surface S, and the reproduction image is visually recognized by the user in the display environment.

Here, the functions of the image processing unit 10 described above can be realized by software processing. Alternatively, the configuration may include hardware for realizing each function. Note that it is also possible to implement part of the functions of the image processing unit 10 by software processing and other parts by hardware.

(1-4. Processing Procedure)

FIG. 10 is a flowchart showing a specific processing procedure example for realizing image correction as the first embodiment described above. Note that the processing shown in FIG. 10 is processing executed for each frame of an input image (in this example, a captured image input from the imaging environment).

First, in step S101, the image processing unit 10 executes foreground-background classification processing. This is the processing performed by the foreground-background classification unit 15 described above. In this example, on the basis of the data of the distance image obtained by the ranging device 5, a portion of the corrected inconsistent portion image in which the distance value is equal to or less than a predetermined value is classified as the foreground image portion, the other portions are classified as the background image portion.

In step S102 subsequent to step S101, the image processing unit 10 executes foreground correction processing. That is, predetermined correction processing is performed on a foreground image, which is an image of a portion classified as a foreground image portion in the input captured image. Specifically, in this example, processing for making the entire foreground image transparent is performed.

In step S103 subsequent to step S102, the image processing unit 10 acquires the last value holding image. That is, the last value holding image obtained by the configuration described with reference to FIG. 9 is obtained.

In step S104 subsequent to step S103, the image processing unit 10 performs inconsistent pixel compensation processing. That is, on the basis of the last value holding image acquired in step S103, pixel compensation for the current inconsistent portion is performed using the overlapping portion with the current inconsistent portion in the past background image. That is, if there is a portion that was visible in the background image in the past in the current inconsistent portion, the pixel values of the portion are applied as they are.

In step S105 subsequent to step S104, the image processing unit 10 determines whether or not there is a portion that cannot be compensated. That is, it is determined whether or not there is a portion of the current inconsistent portion that could not be completely compensated with the past background image in the compensation processing of step S104.

If there is a portion that cannot be compensated, the image processing unit 10 proceeds to step S106 and performs interpolation processing for the portion that cannot be compensated. That is, as described above, interpolation processing is performed on the basis of the pixel values of adjacent pixels.

The image processing unit 10 advances the processing to step S107 in response to execution of the interpolation processing in step S106.

On the other hand, if the image processing unit 10 determines in step S105 that there is no portion that cannot be compensated, the image processing unit 10 skips the interpolation processing in step S106 and advances the processing to step S107.

In step S107, the image processing unit 10 performs blurring processing of the inconsistent portion. As described above, the blurring processing may be any processing that gives a visual blurring effect.

In step S108 subsequent to step S107, the image processing unit 10 generates a corrected foreground image on the basis of the corrected inconsistent portion image. That is, a corrected foreground image is generated on the basis of the corrected inconsistent portion image obtained by performing the compensation processing in step S104, the interpolation processing in step S106 that is executed as necessary, and the blurring processing in step S107.

As can be understood from the above description, in the case of this example in which the processing of making the entire foreground image transparent is performed as the foreground image correction processing, the processing of step S108 uses the corrected inconsistent portion image itself as the corrected foreground image.

In step S109 subsequent to step S108, the image processing unit 10 synthesizes the corrected foreground image and the background image. That is, as described for the synthesis unit 18, the background image of the current frame and the corrected foreground image are synthesized to obtain an image for one frame.

The image processing unit 10 ends the series of processes shown in FIG. 10 in response to execution of the processing of step S109.

In the above example, an example in which the entire foreground image is made transparent as the foreground correction, but it is also possible to make only a portion of the foreground image transparent such as a boundary portion with the foreground image may be made transparent. In that case, only the transparent portion of the classified foreground image portion becomes the inconsistent portion. When only a portion of the foreground image is set as the inconsistent portion in this manner, the corrected inconsistent portion is a portion of the foreground image. Therefore, in the foreground correction unit 16 in this case, the corrected inconsistent portion image, which is set as a portion of the foreground image in this way, and the portion of the foreground image from which the inconsistent portion is removed (that is, the portion that is not made transparent as the foreground correction) are synthesized to generate the corrected foreground image.

Further, reduction processing may be performed as foreground correction. In this case, among the classified foreground image portions, the difference portion between the foreground image after reduction and the foreground image before reduction becomes an inconsistent portion (specifically, a non-image portion).

In this case as well, the corrected inconsistent portion is a portion of the classified foreground image portion. Therefore, in the foreground correction unit 16, the corrected inconsistent portion image, which is set as a portion of the foreground image portion in this way, and the portion of the foreground image portion from which the inconsistent portion is removed (that is, the portion of the foreground image after reduction) are synthesized to generate the corrected foreground image.

(1-5. Modification Example Related to Foreground-Background Classification)

Here, in the above example, an example in which the foreground-background classification unit 15 not only classifies the foreground image portion and the background image portion, but also generates a foreground image and a background image according to these classifications has been illustrated. However, it is not essential that the foreground-background classification unit 15 generates the foreground image and the background image.

FIG. 11 is a diagram showing functional blocks of an image processing unit 10' as a modification example related to foreground-background classification.

Meanwhile, in the following description, parts similar to those that have already been described above will be denoted by the same reference numerals and signs, and description thereof will be omitted.

As shown in the figure, in the image processing unit 10', a foreground-background classification unit 15' is provided instead of the foreground-background classification unit 15, a foreground correction unit 16' is provided instead of the foreground correction unit 16, and an inconsistency correction unit 17 is provided instead of the inconsistency correction unit 17'.

The foreground-background classification unit 15' outputs foreground classification information and background classification information on the basis of the result of the foreground-background classification.

FIGS. 12A and 12B are diagrams showing an example of the foreground classification information and the background classification information.

The foreground classification information is information indicating whether or not each pixel in one frame is classified as a foreground image portion. The background classification information is information indicating whether or not each pixel in one frame is classified as a background image portion.

FIG. 12A illustrates, as an example of the foreground classification information, information in which the value of the pixels classified as the foreground image portion is "1" and the value of the other pixels is "0". FIG. 12B illustrates, as an example of the background classification information, information in which the value of the pixels classified as the background image portion is "1" and the value of the other pixels is "0".

In FIG. 11, the input image and the foreground classification information from the foreground-background classification unit 15' are input to the foreground correction unit 16'. The foreground correction unit 16' obtains a foreground image on the basis of the input image and the foreground classification information, and performs correction processing such as transparency processing on the foreground image.

The input image and the background classification information from the foreground-background classification unit 15' are input to the inconsistency correction unit 17'. The inconsistency correction unit 17' obtains a background image of the current frame on the basis of the input image and the background classification information, and performs the above-described compensation processing and interpolation processing for the inconsistent portion on the basis of the background image.

2. Second Embodiment

A second embodiment will be described below.

In the first embodiment, an example was given in which ranging data obtained by the ranging device 5 is used in foreground-background classification. It is also conceivable that the foreground-background classification is performed by image analysis of the image captured by the imaging device 2.

FIG. 13 is a functional block diagram showing the functional configuration of an image processing unit 10A as the second embodiment.

The image processing unit 10A differs from the image processing unit 10 in that a foreground-background classification unit 15A is provided instead of the foreground-background classification unit 15. The foreground-background classification unit 15A performs image analysis on the captured image from the imaging device 2 as an input image to perform foreground-background classification.

Here, object recognition processing can be considered as image analysis for foreground-background classification by the foreground-background classification unit 15A. Specifically, as object recognition processing, for example, object recognition processing using an image recognizer based on AI (Artificial Intelligence) can be considered.

As an example, it is conceivable to use an AI that has been trained to recognize the distance to a subject from an input image by machine learning (for example, deep learning) using correct data as ranging data and learning input data as an image.

As another example, it is also conceivable to use an AI that has been trained to recognize a foreground image portion and a background image portion from an input image by learning using the identification information of the foreground image portion and the background image portion as correct data and learning input data as an image.

Alternatively, it is conceivable to use an AI that has been trained to enable semantic segmentation to recognize types of general objects. In this case, it is conceivable to adopt a method in which the type of an object assumed to be a subject positioned in the foreground is determined in advance, and among the subjects recognized in an input image, the portion of the subject corresponding to the predetermined type is classified as the foreground image portion.

A method using template matching is also conceivable as foreground-background classification by image analysis. For example, a method of performing matching with an input image using an image template of a back view of a spectator and classifying a matched portion as a foreground image portion can be considered.

3. Third Embodiment

3-1. First Example

A third embodiment changes the size of the distance range in which the input image is classified as the foreground image portion on the basis of a predetermined condition.

In the following, as a specific example, two examples of a case (first example) in which the size of a distance range in which an input image is classified as a foreground image portion is changed according to the user distance on the basis of the image display surface and a case (second example) in which the size of the distance range is changed according to the size of the image display area will be described.

Hereinafter, the distance range in which the input image is classified as the foreground image portion will be referred to as "distance range RD".

FIGS. 14A and 14B are explanatory diagrams of the first example.

In the first example, the size of the distance range RD is changed so as to have a negative correlation with the user distance. The user distance mentioned herein means the distance between the user and the display surface on which the image is displayed.

Specifically, FIG. 14A illustrates the case where the user is close to the display surface (when the user distance is short), and FIG. 14B illustrates the case when the user is far from the display surface (when the user distance is long). The distance range RD when the user distance is short is made larger than when the user distance is long. FIGS. 14A and 14B illustrate examples in which the distance range RD is set from the first row (the most front row) to the second row when the user distance is short, and only the first row is set as the distance range RD when the user distance is long.

Note that the size of the distance range RD can be set by setting a distance threshold used for foreground-background classification.

FIG. 15 is a block diagram for explaining the configuration of a projector device 1B as a first example of the third embodiment.

First, in the display environment in this case, a ranging device 6 is provided for measuring the user distance. The ranging device 6 is configured to obtain a distance image, for example, in the same manner as the ranging device 5 described above. The ranging device 6 is arranged so as to measure the distance in the direction in which the user exists from the projection surface S (that is, the image display surface) side, so that the distance to the user can be measured. As the user distance, it is not essential to strictly measure the distance between the display surface and the user. It is sufficient that at least distance information correlated with the distance between the display surface and the user can be obtained.

The projector device 1B differs from the projector device 1 in that an image processing unit 10B is provided instead of the image processing unit 10. The image processing unit 10B differs from the image processing unit 10 in that it has a foreground-background classification unit 15B instead of the foreground-background classification unit 15.

The foreground-background classification unit 15B estimates the user distance on the basis of the ranging data (the distance image data in this example) obtained by the ranging device 6. Here, as for the user distance, when a plurality of users (objects as persons) are recognized within the range-finding field of view, the shortest distance among the plurality of users is selected. Alternatively, it is also conceivable to use an average value or the like for the distances of those multiple users.

The foreground-background classification unit 15B compares the estimated user distance value with a predetermined threshold, sets a first distance range (for example, from the first row to the second row) as the distance range RD if the user distance is equal to or less than the threshold, and set a second distance range narrower than the first distance range (for example, the distance range up to the first row) as the distance range RD if the user distance is not equal to or less than the threshold.

3-2. Second Example

FIGS. 16A and 16B are explanatory diagrams of the second example.

In the second example, the size of the distance range RD is changed so as to have a positive correlation with the size of the image display area.

Specifically, FIG. 16A illustrates a case where the image display area is small, and FIG. 16B illustrates a case where the image display area is large. The distance range RD when the display area is large is made larger than when the display area is small. FIGS. 16A and 16B illustrate examples in which the distance range RD is set up to the first row when the display area is small, and the distance range RD is set from the first row to the second row when the display area is large.

FIG. 17 is a block diagram for explaining the configuration of a projector device 1C as a second example in the third embodiment.

As illustrated in the figure, in the projector device 1C, the control unit 13 has a display area control unit 13*a*. Although not shown, the projection unit 12 is provided with an adjustment mechanism for optically adjusting the size of the image display area on the projection surface S. The display area control unit 13*a* controls the adjustment mechanism to change the size of the display area.

In the projector device 1C, an image processing unit 10C is provided instead of the image processing unit 10, and the image processing unit 10C differs from the image processing unit 10 in that a foreground-background classification unit 15C is provided instead of the foreground-background classification unit 15.

Here, the display area control unit 13*a* outputs information indicating the display area size of the image on the projection surface S (hereinafter referred to as "display area size information") to the foreground-background classification unit 15C.

On the basis of the display area size information output by the display area control unit 13*a*, the foreground-background classification unit 15C sets a first distance range (for example, a distance range from the first row to the second row) as the distance range RD if the display area size is equal to or greater than a predetermined threshold, and sets a second distance range narrower than the first distance range (for example, the distance range up to the first row) as the distance range RD if the display area size is not equal to or greater than the threshold.

In the above description, it is assumed that the size of the image display area is dynamically changed by the optical adjustment in the projection unit 12. However, as a case where the display area has a different size, for example, the projection unit 12 may have different distances to the projection surface S. For example, as the display environment, there may be an environment in which there is enough space and a sufficient distance from the projection unit 12 to the projection surface S can be secured, and an environment in which there is no space and a sufficient space from the projection unit 12 to the projection surface S cannot be secured. The display area size is large in the former environment, and the display area size is small in the latter environment. It is conceivable to change the size of the distance range RD in response to the change in display area size due to such an environmental difference. In that case, information indicating the size of the display area may be estimated from an image captured by a camera that captures the projection surface S, for example. Alternatively, it is conceivable to measure the distance from the projection unit 12 to the projection surface S and estimate the size of the display area from the measured distance.

Here, in the first and second examples described above, the distance range RD is adjusted in two steps, but it is naturally possible to adjust the distance range RD in three steps or more.

Moreover, the first example and the second example described above can be combined. That is, it is also possible to adjust the distance range RD on the basis of both the user distance and the display area size.

4. Modification Example

The embodiment is not limited to the specific examples described above, and configurations as various modification examples can be adopted.

For example, in the above example, the foreground correction is performed to make the foreground subject less noticeable. However, the foreground correction can also be performed as processing of correcting the display size of the foreground subject to a life-size, as illustrated in FIGS. 18A, 18B, 19A and 19B, for example.

Specifically, FIGS. 18A, 18B, 19A and 19B show examples of a user (represented by diagonal lines) in a display environment, a projection surface S located behind the user, and an image displayed on the projection surface S. In addition, FIGS. 18A and 18B images a virtual experience such as a shopping mall and FIGS. 19A and 19B images a remote dance lesson.

In FIGS. 18A and 19A, a person as a subject is captured in a close-up shot close to the imaging device 2 in the imaging environment. As foreground correction, the foreground subject portion that is captured in a close-up shot in this way is corrected so as to be reduced to a life-size as the foreground correction.

Here, as the life-size processing, in addition to the processing of reducing the target subject as described above, the processing of offsetting the position of the target subject in the image to the depth side can also be performed. As a result, life-size representation can be performed more appropriately than when only resizing is performed.

In the description so far, an example has been given in which the foreground-background classification is performed by classifying the distance range RD, but the foreground-background classification can also be performed on the basis of the difference in distance between subjects. For example, FIG. 20 illustrates a scene in which one spectator in the first row raises his/her hand. As shown in the figure, when the hand part covers the playing field on the back side, the distance difference between the hand part and the playing field becomes large.

Therefore, for example, it is conceivable to calculate the distance difference from surrounding pixels for a subject within a certain distance range on the foreground side, and classify an image portion of the subject having a large distance difference as a foreground subject portion. As can be seen with reference to the example of FIG. 20, a portion with a large distance difference from the surroundings is a portion which is likely to give the user a sense of strangeness. Therefore, by classifying the portion as a foreground image portion and performing foreground correction, that is, correction to make the portion less noticeable such as transparency processing, it is possible to improve the effect of alleviating the user's sense of strangeness.

In the above description, transparency or reduction processing has been illustrated as the foreground correction, but correction using a virtual image can also be performed as the foreground correction. For example, it is conceivable to replace it with an image of a human figure prepared in advance.

Foreground correction may also be correction related to color.

For example, the color saturation and brightness of at least a portion of the portion classified as the foreground image portion is reduced to make it less noticeable. In this case as well, the inconsistent portion caused by the correction is compensated if it can be compensated with the past background image. In addition, it is possible to perform interpolation using values of adjacent pixels for portions that cannot be compensated. Furthermore, it is also possible to apply blurring processing to the corrected inconsistent portion image obtained by applying the compensation and interpolation processing.

In the above-described example, an example was given in which foreground-background classification was performed on the basis of ranging data or image analysis. The foreground-background classification may be performed, for example, on the basis of an operation (manual operation by the user) of specifying at least one of the foreground image portion and the background image portion.

In the above example, an example in which the image processing device according to the present technology is applied to a projector device has been given. The image processing device according to the present technology can also be applied to self-luminous display devices such as LED (Light Emitting Diode) displays, LCD (Liquid Crystal Displays), and organic EL (Electro-Luminescence) displays.

The image processing device according to the present technology can be configured as a device separate from the display device. For example, in the system shown in FIG. 1, an image processing device is provided that receives captured images and ranging data from the imaging environment side via the network 4, and the image processing device performs image processing as an embodiment such as the foreground-background classification, the foreground correction, and the inconsistent portion correction. Then, it is possible to employ a configuration in which the image processing device transmits the image-processed captured image to the projector device. By adopting such a configuration, there is an advantage that an existing device that does not have an image processing function as the embodiment can be used as a display device such as a projector device. Moreover, the present invention is suitable for application to a multi-projection system in which a plurality of projector devices share and project a reproduction image based on an input image.

5. Summary of Embodiment

An image processing device (image processing unit 10, 10', 10A, 10B, 10C) of the embodiment includes: a foreground-background classification unit (15, 15', 15A, 15B, 15C) configured to classify an input image into a foreground image portion which is a portion in which a subject in a foreground is captured and a background image portion which is a portion in which a subject in a background farther than the foreground image portion is captured; a foreground correction unit (16, 16') configured to correct the foreground image portion; and an inconsistency correction unit (17, 17') configured to correct an inconsistent portion caused by the correction of the foreground image portion by the foreground correction unit.

According to the above configuration, a subject in the foreground captured in a close-up shot is less noticeable by the correction of the foreground correction unit, and the inconsistent portion caused by the correction of the foreground correction unit is corrected by the inconsistency correction unit. As a result, it is possible to alleviate the user's sense of strangeness due to the inconsistent portion.

Therefore, it is possible to alleviate the user's sense of strangeness associated with the display of the foreground subject and to improve the user's sense of immersion in the image content. Here, if the subject in the foreground is a person, privacy will be a problem if the close-up is left as it is, but by performing foreground correction such as transparency or reduction processing as illustrated above, privacy can be protected.

In the image processing device of the embodiment, the foreground-background classification unit (15, 15', 15B, 15C) classifies the input image into the foreground image portion and the background image portion on the basis of ranging information of the subject in the input image. By using the ranging information of the subject, it becomes possible to appropriately identify the foreground image portion or the background image portion.

Therefore, it is possible to improve the classification accuracy between the foreground image portion and the background image portion.

Furthermore, in the image processing device of the embodiment, the foreground-background classification unit classifies the input image into the foreground image portion and the background image portion on the basis of a difference in distance between subjects in the input image (see FIG. 20).

By performing classification based on the difference in distance, a portion with a large distance difference from a specific portion in the background, for example, a portion of the user's hand on the field of a stadium, which is likely to give the user a sense of strangeness, can be specified as the foreground image portion.

Therefore, it is possible to improve the effect of alleviating the sense of strangeness.

Furthermore, in the image processing device of the embodiment, the foreground-background classification unit (15A) classifies the input image into the foreground image portion and the background image portion on the basis of an image analysis result of the input image (see the second embodiment).

As a result, there is no need to use a ranging sensor in classifying the input image into the foreground image portion and the background image portion.

Therefore, it is possible to reduce the number of sensors required for alleviating the user's sense of strangeness due to the display of the foreground subject, and to reduce the number of components required for system construction and the cost.

In the image processing device of the embodiment, the foreground-background classification unit classifies the input image into the foreground image portion and the background image portion on the basis of a result of object recognition processing performed on the input image.

In this way, it is possible to appropriately recognize in which part of the image an object that should be in the foreground or in the background exists.

Therefore, it is possible to appropriately classify the input image into the foreground image portion and the background image portion.

Furthermore, in the image processing device of the embodiment, the foreground-background classification unit performs the object recognition processing using an image recognizer based on artificial intelligence.

If an image recognizer based on artificial intelligence is used, it becomes possible to appropriately set factors for object recognition, such as the types of objects that can be recognized and the accuracy of recognition, depending on how it learns.

Therefore, it is possible to appropriately classify the input image into the foreground image portion and the background image portion on the basis of an appropriate object recognition result.

Furthermore, in the image processing device of the embodiment, the foreground-background classification unit performs image analysis based on template matching to classify the input image into the foreground image portion and the background image portion.

As a result, there is no need to perform learning based on artificial intelligence in classifying the input image into the foreground image portion and the background image portion.

Therefore, the cost required for learning can be reduced.

In the image processing device according to the embodiment, the foreground correction unit makes at least a portion of the foreground image portion transparent or reduced in size as the correction of the foreground image portion.

By performing transparency and reduction processing as described above, it is possible to make the subject in the foreground less noticeable.

Therefore, it is possible to alleviate the user's sense of strangeness associated with the display of the foreground subject.

In the image processing device of the embodiment, the inconsistency correction unit performs correction using an image of an overlapping portion of the background image portion in a past frame overlapping a current inconsistent portion which is the inconsistent portion in a current frame as correction of the current inconsistent portion.

For example, if the subject in the foreground is a spectator seated in the audience seats, the subject may move, and the background portion that is not visible in the current inconsistent portion in the current frame may be visible as the overlapping portion in the past frame. According to the above configuration, if there is such an overlapping portion with the current inconsistent portion in the background image portion of the past frame, the current inconsistent portion is corrected using the image of the overlapping portion.

Therefore, it is possible to appropriately correct the current inconsistent portion using the image portion of the subject that was actually seen in the background.

Furthermore, in the image processing device of the embodiment, the inconsistency correction unit generates a last value holding image which is an image holding a pixel value when the input image is last classified into the background image portion in a period earlier than at least a current frame for each pixel of the input image and performs correction of the current inconsistent portion using the last value holding image.

As a result, if an overlapping portion with the current inconsistent portion is present in the past background image portion, the pixel values of the pixels of the overlapping portion when the input image is last classified into the background image portion are used for correction of the current inconsistent portion.

Therefore, it is possible to correct the inconsistent portion of the current frame using the latest image that was actually seen in the background, improve the correction accuracy of the inconsistent portion, and alleviate the sense of strangeness caused by the correction.

In the image processing device of the embodiment, the inconsistency correction unit generates the last value holding image by performing processing of holding a pixel value of a pixel classified into the background image portion and maintaining an existing holding value for a pixel classified into the foreground image portion over a plurality of frames of the input image. In this way, it is possible to appropriately generate the last value holding image.

Furthermore, in the image processing device of the embodiment, the inconsistency correction unit interpolates pixel values using the image of the overlapping portion for portion of the current inconsistent portion where the overlapping portion is not present.

As a result, even if the overlapping portion with the current inconsistent portion is only a portion, it is possible to appropriately interpolate the pixels other than the overlapping portion using the image of the overlapping portion.

Therefore, it is possible to improve the correction accuracy of the inconsistent portion, and to alleviate the sense of strangeness caused by the correction.

Furthermore, in the image processing device of the embodiment, the foreground-background classification unit (15B) changes a size of a distance range in which the input image is classified into the foreground image portion so as to have a negative correlation with a distance between a display surface on which the input image is displayed and a user viewing an image displayed on the display surface.

When the distance between the display surface and the user is short, since the subject in the image will appears larger to the user, the distance range of the foreground that the user feels a sense of strangeness with is also widened. Therefore, as described above, the size of the distance range in which the input image is classified as the foreground image portion is changed so as to have a negative correlation with the distance between the display surface and the user. That is, the shorter the distance, the larger the distance range in which the input image is classified as the foreground image portion.

As a result, even if the distance between the display surface and the user changes, the range of the foreground image portion to be corrected for alleviating the sense of strangeness can be appropriately classified. That is, it is possible to perform appropriate correction according to the distance between the display surface and the user as the correction for alleviating the sense of strangeness.

In the image processing device of the embodiment, the foreground-background classification unit (15C) changes a size of a distance range in which the input image is classified as the foreground image portion so as to have a positive correlation with a size of a display area of the input image. When the display area for displaying the input image is large, since the subject in the image will appear larger to the user, the distance range of the foreground that the user feels a sense of strangeness with is also widened. Therefore, the size of the distance range in which the input image is classified as the foreground image portion as described above is changed so as to have a positive correlation with the size of the display area. That is, the larger the display area, the larger the distance range in which the input image is classified as the foreground image portion. As a result, even if the size of the display area changes, the range of the foreground image portion to be corrected for alleviating the sense of strangeness can be appropriately classified. That is, it is possible to perform appropriate correction according to the size of the display area as the correction for alleviating the sense of strangeness.

An image processing method of the embodiment includes: classifying an input image into a foreground image portion which is a portion in which a subject in a foreground is captured and a background image portion which is a portion in which a subject in a background farther than the foreground image portion is captured; correcting the foreground image portion; and correcting an inconsistent portion caused by the correction of the foreground image portion.

According to such an image processing method, it is possible to obtain the same actions and effects as those of the image processing device as the embodiment described above.

A projector device (1, 1B, 1C) of the embodiment includes: a foreground-background classification unit configured to classify an input image into a foreground image portion which is a portion in which a subject in a foreground is captured and a background image portion which is a portion in which a subject in a background farther than the foreground image portion is captured; a foreground correction unit configured to correct the foreground image portion; an inconsistency correction unit configured to correct an inconsistent portion caused by the correction of the foreground image portion by the foreground correction unit; and a projection unit (12) configured to generate a reproduction image based on an image of the inconsistent portion corrected by the inconsistency correction unit and project the reproduction image onto a projection surface.

According to such a projector device, it is possible to obtain the same actions and effects as those of the image processing device as the embodiment described above.

Note that the advantageous effects described in the present specification are merely exemplary and are not limited, and other advantageous effects may be obtained.

6. Present Technology

Meanwhile, the present technology can also adopt the following configurations.

(1)

An image processing device comprising:

a foreground-background classification unit configured to classify an input image into a foreground image portion which is a portion in which a subject in a foreground is captured and a background image portion which is a portion in which a subject in a background farther than the foreground image portion is captured;

a foreground correction unit configured to correct the foreground image portion; and an inconsistency correction unit configured to correct an inconsistent portion caused by the correction of the foreground image portion by the foreground correction unit.

(2)

The image processing device according to (1), wherein the foreground-background classification unit is configured to:

classify the input image into the foreground image portion and the background image portion on the basis of ranging information of the subject in the input image.

(3)

The image processing device according to (2), wherein the foreground-background classification unit is configured to classify the input image into the foreground image portion and the background image portion on the basis of a difference in distance between subjects in the input image.

(4)

The image processing device according to any one of (1) to (3), wherein the foreground-background classification unit is configured to:

classify the input image into the foreground image portion and the background image portion on the basis of an image analysis result of the input image.

(5)

The image processing device according to (4), wherein the foreground-background classification unit is configured to:

classify the input image into the foreground image portion and the background image portion on the basis of a result of object recognition processing performed on the input image.

(6)

The image processing device according to (5), wherein the foreground-background classification unit is configured to:

perform the object recognition processing using an image recognizer based on artificial intelligence.

(7)

The image processing device according to (4), wherein the foreground-background classification unit is configured to:

perform image analysis based on template matching to classify the input image into the foreground image portion and the background image portion.

(8)

The image processing device according to any one of (1) to (7), wherein the foreground correction unit is configured to:

make at least a portion of the foreground image portion transparent or reduced in size as the correction of the foreground image portion.

(9)

The image processing device according to any one of (1) to (8), wherein the inconsistency correction unit is configured to:

perform correction using an image of an overlapping portion of the background image portion in a past frame overlapping a current inconsistent portion that is the inconsistent portion in a current frame as correction of the current inconsistent portion.

(10)

The image processing device according to (9), wherein the inconsistency correction unit is configured to:

generate a last value holding image that is an image holding a pixel value when the input image is last classified into the background image portion in a period earlier than at least a current frame for each pixel of the input image and perform correction of the current inconsistent portion using the last value holding image.

(11)

The image processing device according to (10), wherein the inconsistency correction unit is configured to:

generate the last value holding image by performing processing of holding a pixel value of a pixel classified into the background image portion and maintaining an existing holding value for a pixel classified into the foreground image portion over a plurality of frames of the input image.

(12)

The image processing device according to any one of (9) to (11), wherein the inconsistency correction unit is configured to:

interpolate pixel values using the image of the overlapping portion for portion of the current inconsistent portion where the overlapping portion is not present.

(13)

The image processing device according to any one of (1) to (12), wherein the foreground-background classification unit is configured to:

change a size of a distance range in which the input image is classified into the foreground image portion so as to have a negative correlation with a distance between a display surface on which the input image is displayed and a user viewing an image displayed on the display surface.

(14)

The image processing device according to any one of (1) to (13), wherein the foreground-background classification unit is configured to:

change a size of a distance range in which the input image is classified as the foreground image portion so as to have a positive correlation with a size of a display area of the input image.

(15)

An image processing method comprising:

classifying an input image into a foreground image portion which is a portion in which a subject in a foreground is captured and a background image portion which is a portion in which a subject in a background farther than the foreground image portion is captured;

correcting the foreground image portion; and correcting an inconsistent portion caused by the correction of the foreground image portion.

(16)

A projector device comprising:

a foreground-background classification unit configured to classify an input image into a foreground image portion which is a portion in which a subject in a foreground is captured and a background image portion which is a portion in which a subject in a background farther than the foreground image portion is captured;

a foreground correction unit configured to correct the foreground image portion;

an inconsistency correction unit configured to correct an inconsistent portion caused by the correction of the foreground image portion by the foreground correction unit; and a projection unit configured to generate a reproduction image based on an image of the inconsistent portion corrected by the inconsistency correction unit and project the reproduction image onto a projection surface.

REFERENCE SIGNS LIST

100 Image display system
1, 1B, 1C Projector device
2 Imaging device
5, 6 Ranging device
10, 10', 10A, 10B, 10C Image processing unit
12 Projection unit
12*a* Spatial light modulator
13 Control unit
13*a* Display area control unit
15, 15', 15A, 15B, 15C Foreground-background classification unit
16, 16' Foreground correction unit
16*a* Transparency processing unit
16*b* Reduction processing unit
17, 17' Inconsistency correction unit
17*a* Last value holding image generation unit
17*b* Inconsistent pixel correction unit
17*c* Blurring processing unit
18 Synthesis unit
21 Frame memory
22 Write control unit
23 Read control unit
S Projection surface

What is claimed is:

1. An image processing device, comprising:

a foreground-background classification unit configured to classify an input image into a foreground image portion which is a portion in which a subject in a foreground is captured and a background image portion which is a portion in which a subject in a background farther than the foreground image portion is captured;

a foreground correction unit configured to correct the foreground image portion; and an inconsistency correction unit configured to correct an inconsistent portion caused by the correction of the foreground image portion by the foreground correction unit.

2. The image processing device according to claim 1, wherein the foreground-background classification unit is configured to:

classify the input image into the foreground image portion and the background image portion based on ranging information of the subject in the input image.

3. The image processing device according to claim 2, wherein the foreground-background classification unit is configured to:

classify the input image into the foreground image portion and the background image portion based on a difference in distance between subjects in the input image.

4. The image processing device according to claim 1, wherein the foreground-background classification unit is configured to:

classify the input image into the foreground image portion and the background image portion based on an image analysis result of the input image.

5. The image processing device according to claim 4, wherein the foreground-background classification unit is configured to:

classify the input image into the foreground image portion and the background image portion based on a result of object recognition processing performed on the input image.

6. The image processing device according to claim 5, wherein the foreground-background classification unit is configured to:

perform the object recognition processing using an image recognizer based on artificial intelligence.

7. The image processing device according to claim 4, wherein the foreground-background classification unit is configured to:

perform image analysis based on template matching to classify the input image into the foreground image portion and the background image portion.

8. The image processing device according to claim 1, wherein the foreground correction unit is configured to:

make at least a portion of the foreground image portion transparent or reduced in size as the correction of the foreground image portion.

9. The image processing device according to claim 1, wherein the inconsistency correction unit is configured to:

perform correction using an image of an overlapping portion of the background image portion in a past frame overlapping a current inconsistent portion that is the inconsistent portion in a current frame as correction of the current inconsistent portion.

10. The image processing device according to claim 9, wherein the inconsistency correction unit is configured to:

generate a last value holding image that is an image holding a pixel value when the input image is last classified into the background image portion in a period earlier than at least a current frame for each pixel of the input image and perform correction of the current inconsistent portion using the last value holding image.

11. The image processing device according to claim 10, wherein the inconsistency correction unit is configured to:

generate the last value holding image by performing processing of holding a pixel value of a pixel classified into the background image portion and maintaining an existing holding value for a pixel classified into the foreground image portion over a plurality of frames of the input image.

12. The image processing device according to claim 9, wherein the inconsistency correction unit is configured to:

interpolate pixel values using the image of the overlapping portion for portion of the current inconsistent portion where the overlapping portion is not present.

13. The image processing device according to claim 1, wherein the foreground-background classification unit is configured to:

change a size of a distance range in which the input image is classified into the foreground image portion so as to have a negative correlation with a distance between a display surface on which the input image is displayed and a user viewing an image displayed on the display surface.

14. The image processing device according to claim 1, wherein the foreground-background classification unit is configured to:

change a size of a distance range in which the input image is classified as the foreground image portion so as to have a positive correlation with a size of a display area of the input image.

15. A projector device, comprising:

a foreground-background classification unit configured to classify an input image into a foreground image portion which is a portion in which a subject in a foreground is captured and a background image portion which is a portion in which a subject in a background farther than the foreground image portion is captured;

a foreground correction unit configured to correct the foreground image portion;

an inconsistency correction unit configured to correct an inconsistent portion caused by the correction of the foreground image portion by the foreground correction unit; and a projection unit configured to generate a reproduction image based on an image of the inconsistent portion corrected by the inconsistency correction unit and project the reproduction image onto a projection surface.

* * * * *